United States Patent
Tanaka et al.

(10) Patent No.: US 11,128,800 B2
(45) Date of Patent: Sep. 21, 2021

(54) IMAGE BLUR CORRECTION DEVICE, IMAGING APPARATUS, IMAGE BLUR CORRECTION METHOD, AND IMAGE BLUR CORRECTION PROGRAM

(71) Applicant: FUJIFILM Corporation, Tokyo (JP)

(72) Inventors: Koichi Tanaka, Saitama (JP); Fuminori Irie, Saitama (JP); Junya Kitagawa, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/133,517

(22) Filed: Dec. 23, 2020

(65) Prior Publication Data

US 2021/0120177 A1     Apr. 22, 2021

Related U.S. Application Data

(63) Continuation of application No. PCT/JP2019/023132, filed on Jun. 11, 2019.

(30) Foreign Application Priority Data

Jun. 27, 2018 (JP) .............................. JP2018-122366

(51) Int. Cl.
    *H04N 5/232* (2006.01)
(52) U.S. Cl.
    CPC ..... *H04N 5/23258* (2013.01); *H04N 5/23267* (2013.01); *H04N 5/232933* (2018.08)
(58) Field of Classification Search
    None
    See application file for complete search history.

(56) References Cited

U.S. PATENT DOCUMENTS

| 2006/0098967 A1* | 5/2006 | Togawa | H04N 5/23287 396/55 |
| 2006/0165398 A1* | 7/2006 | Imada | G03B 5/00 396/55 |

(Continued)

FOREIGN PATENT DOCUMENTS

| JP | 2005-003719 A | 1/2005 |
| JP | 2013-246401 A | 12/2013 |

(Continued)

OTHER PUBLICATIONS

International Search Report issued in PCT/JP2019/023132; dated Aug. 6, 2019.
Written Opinion issued in PCT/JP2019/023132; dated Aug. 6, 2019.

*Primary Examiner* — James M Hannett
(74) *Attorney, Agent, or Firm* — Studebaker & Brackett PC

(57) ABSTRACT

An image blur correction device includes an acceleration sensor, an angular velocity sensor, and a system control unit that calculates rotational acceleration components which are included in detected accelerations and are generated by rotation of a digital camera around a rotation axis parallel to an optical axis, and corrects blurs of the captured image signal in directions based on accelerations obtained by subtracting the rotational acceleration components from the accelerations detected by the acceleration sensor. The system control unit selects one of rotation axes based on a usage state of the digital camera, and calculates the rotational acceleration components generated by the rotation of the digital camera around the selected rotation axis based on an angular velocity and distances in the directions from the selected rotation axis to the acceleration sensor.

20 Claims, 13 Drawing Sheets

(56) References Cited

U.S. PATENT DOCUMENTS

| | | | | |
|---|---|---|---|---|
| 2010/0245603 | A1* | 9/2010 | Hashi | H04N 5/23258 |
| | | | | 348/208.5 |
| 2013/0162847 | A1* | 6/2013 | Miyazawa | H04N 5/23248 |
| | | | | 348/208.1 |
| 2014/0327789 | A1 | 11/2014 | Tsuchiya et al. | |
| 2019/0222767 | A1 | 7/2019 | Imanishi | |
| 2019/0342498 | A1* | 11/2019 | Tsuchiya | H04N 5/23209 |

FOREIGN PATENT DOCUMENTS

| | | |
|---|---|---|
| JP | 2014-164290 A | 9/2014 |
| WO | 2018/070468 A1 | 4/2018 |

* cited by examiner

IMAGE BLUR CORRECTION DEVICE, IMAGING APPARATUS, IMAGE BLUR CORRECTION METHOD, AND IMAGE BLUR CORRECTION PROGRAM

CROSS REFERENCE TO RELATED APPLICATION

This is a continuation of International Application No. PCT/JP2019/023132 filed on Jun. 11, 2019, and claims priority from Japanese Patent Application No. 2018-122366 filed on Jun. 27, 2018, the entire disclosures of which are incorporated herein by reference.

BACKGROUND OF THE INVENTION

1. Field of the Invention

The present invention relates to an image blur correction device, an imaging apparatus, an image blur correction method, and a computer readable medium storing an image blur correction program.

2. Description of the Related Art

An imaging apparatus comprising an imaging element for imaging a subject through an imaging optical system has an image blur correction function of correcting a blur (hereinafter, also referred to as an image blur) of a captured image signal caused by vibration of the apparatus. The image blur includes a shift blur, an angular blur, and a rotation blur.

The shift blur is a blur (hereinafter, also referred to as a translation blur) of the captured image signal caused by the vibration (translational motion) of the apparatus in a direction along each of two orthogonal sides of a light receiving surface of the imaging element. The angular blur is a blur of the captured image signal caused by rotations (referred to as a pitch rotation and a yaw rotation) of the apparatus around each of two rotation axes which are perpendicular to an optical axis of the imaging optical system and are orthogonal to each other.

The rotation blur is a blur of the captured image signal caused by rotation (also referred to as a roll rotation) of the apparatus around a rotation axis parallel to the optical axis of the imaging optical system.

JP2014-164290A describes a camera that performs image blur correction by moving a lens or an imaging element. This camera calculates a posture of the camera by using a three-axis acceleration sensor and a three-axis angular velocity sensor, and calculates only an acceleration component generated by a translational motion of the camera by calculating and removing a gravitational acceleration component included in an output of the acceleration sensor. Accordingly, it is possible to correct a blur of a captured image signal in a translation direction with high accuracy.

SUMMARY OF THE INVENTION

In a case where it is assumed that the imaging element moves in translation and roll-rotates at the same time, the acceleration sensor detects the acceleration caused by the roll rotation of the imaging apparatus in addition to the acceleration caused by the translational motion of the imaging apparatus.

In a case where a position of a rotation center during the roll rotation of the imaging apparatus is determined in advance, it is possible to detect only the acceleration component caused by the translational motion of the imaging apparatus from the output of the angular velocity sensor and the output of the acceleration sensor. However, in an actual usage scene, the position of this rotation center may change rather than being constant. JP2014-164290A does not consider such a change in the position of the rotation center.

The present invention has been made in view of the above circumstances, and an object of the present invention is to provide an image blur correction device capable of correcting a blur of a captured image signal caused by a translational motion of an imaging apparatus with high accuracy, an imaging apparatus comprising the image blur correction device, an image blur correction method, and a computer readable medium storing an image blur correction program.

An image blur correction device according to an embodiment of the present invention is an image blur correction device configured to correct a blur of a captured image signal output from an image sensor that images a subject through an imaging optical system. The device comprises an acceleration sensor that detects accelerations in two directions which are orthogonal to an optical axis of the imaging optical system of an imaging apparatus including the image sensor and are orthogonal to each other, an angular velocity sensor that detects an angular velocity of the imaging apparatus around a rotation axis parallel to the optical axis, a rotational acceleration component calculator that calculates rotational acceleration components which are included in the accelerations detected by the acceleration sensor and are generated by rotation of the imaging apparatus around the rotation axis, and a blur corrector that corrects blurs of the captured image signal in the two directions based on accelerations obtained by subtracting the rotational acceleration components from the accelerations detected by the acceleration sensor. The rotational acceleration component calculator selects one rotation axis from among a plurality of the rotation axes determined in advance based on a usage state of the imaging apparatus, and calculates the rotational acceleration components generated by the rotation of the imaging apparatus around the selected rotation axis based on the angular velocity detected by the angular velocity sensor and distances in the two directions from the selected rotation axis to the acceleration sensor.

An imaging apparatus according to an embodiment of the present invention comprises the image blur correction device and the image sensor.

An image blur correction method according to an embodiment of the present invention is an image blur correction method of correcting a blur of a captured image signal output from an image sensor that images a subject through an imaging optical system. The method comprises a rotational acceleration component calculation step of calculating rotational acceleration components which are included in accelerations detected by an acceleration sensor that detects the accelerations in two directions which are orthogonal to an optical axis of the imaging optical system of an imaging apparatus including the image sensor and are orthogonal to each other and are generated by rotation of the imaging apparatus around a rotation axis parallel to the optical axis, and a blur correction step of correcting blurs of the captured image signal in the two directions based on accelerations obtained by subtracting the rotational acceleration components from the accelerations detected by the acceleration sensor. In the rotational acceleration component calculation step, one rotation axis is selected from among a plurality of the rotation axes determined in advance based on a usage state of the imaging apparatus, and the rotational acceleration components generated by the rotation of the imaging apparatus around the selected rotation axis are calculated based on an angular velocity detected by an angular velocity sensor that detects the angular velocity of the imaging apparatus around the rotation axis and distances in the two directions from the selected rotation axis to the acceleration sensor.

A non-transitory computer readable medium storing an image blur correction program according to an embodiment of the present invention is an image blur correction program for correcting a blur of a captured image signal output from an image sensor that images a subject through an imaging optical system. The program causes a computer to execute a rotational acceleration component calculation step of calculating rotational acceleration components which are included in accelerations detected by an acceleration sensor that detects the accelerations in two directions which are orthogonal to an optical axis of the imaging optical system of an imaging apparatus including the image sensor and are orthogonal to each other and are generated by rotation of the imaging apparatus around a rotation axis parallel to the optical axis, and a blur correction step of correcting blurs of the captured image signal in the two directions based on accelerations obtained by subtracting the rotational acceleration components from the accelerations detected by the acceleration sensor. In the rotational acceleration component calculation step, one rotation axis is selected from among a plurality of the rotation axes determined in advance based on a usage state of the imaging apparatus, and the rotational acceleration components generated by the rotation of the imaging apparatus around the selected rotation axis are calculated based on an angular velocity detected by an angular velocity sensor that detects the angular velocity of the imaging apparatus around the selected rotation axis and distances in the two directions from the selected rotation axis to the acceleration sensor.

According to the present invention, it is possible to provide an image blur correction device capable of correcting a blur of a captured image signal caused by a translational motion of an imaging apparatus with high accuracy, an imaging apparatus comprising the image blur correction device, an image blur correction method, and an image blur correction program.

DESCRIPTION OF THE PREFERRED EMBODIMENTS

Hereinafter, an embodiment of the present invention will be described with reference to the drawings.

Figure 1:
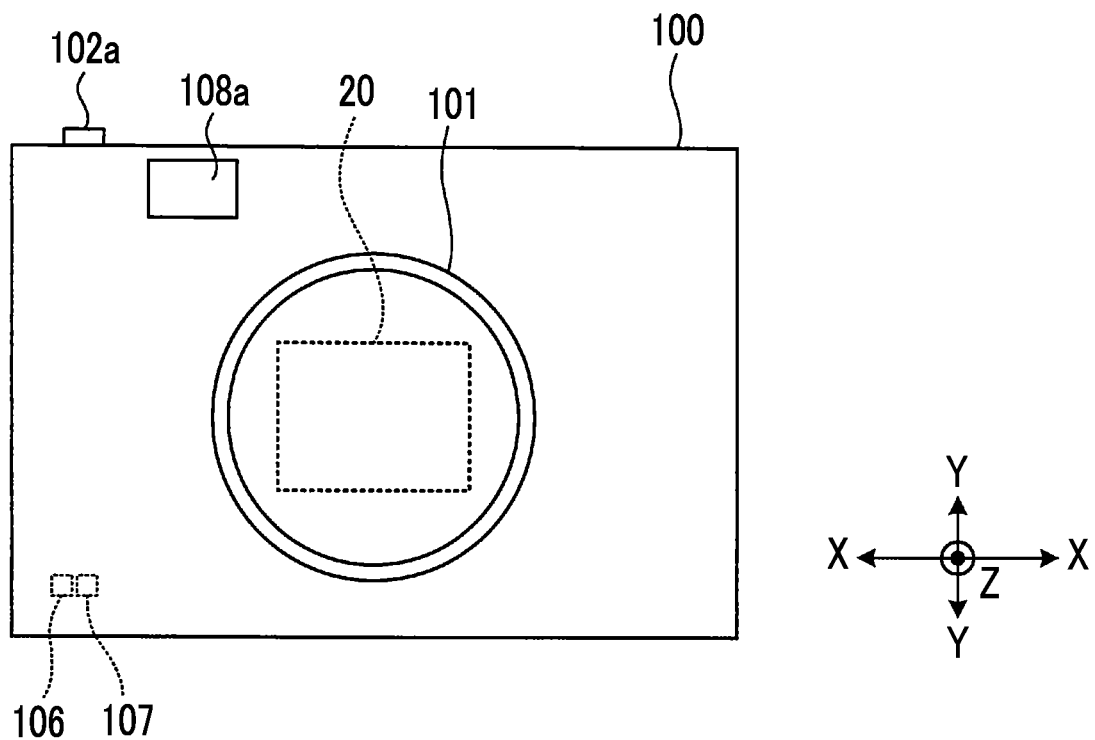
FIG. 1 is a front view showing a schematic configuration of a digital camera 100 which is an embodiment of an imaging apparatus of the present invention.
Figure 2:
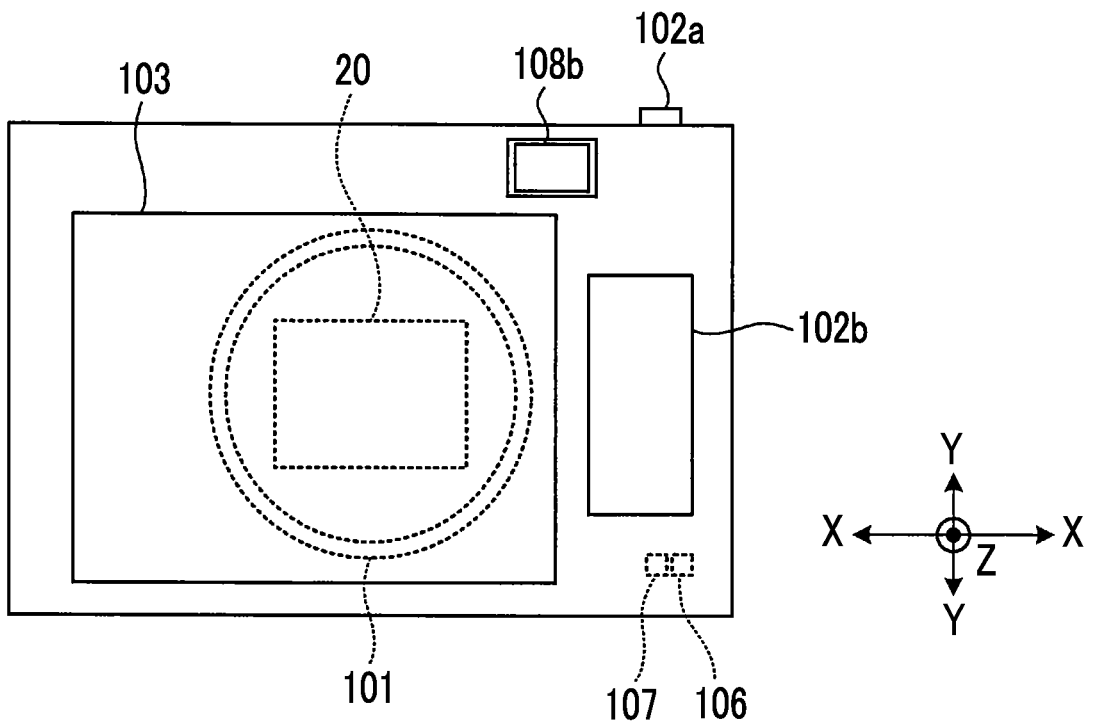
FIG. 2 is a rear view showing a schematic configuration of the digital camera 100 shown in FIG. 1.
Figure 3:
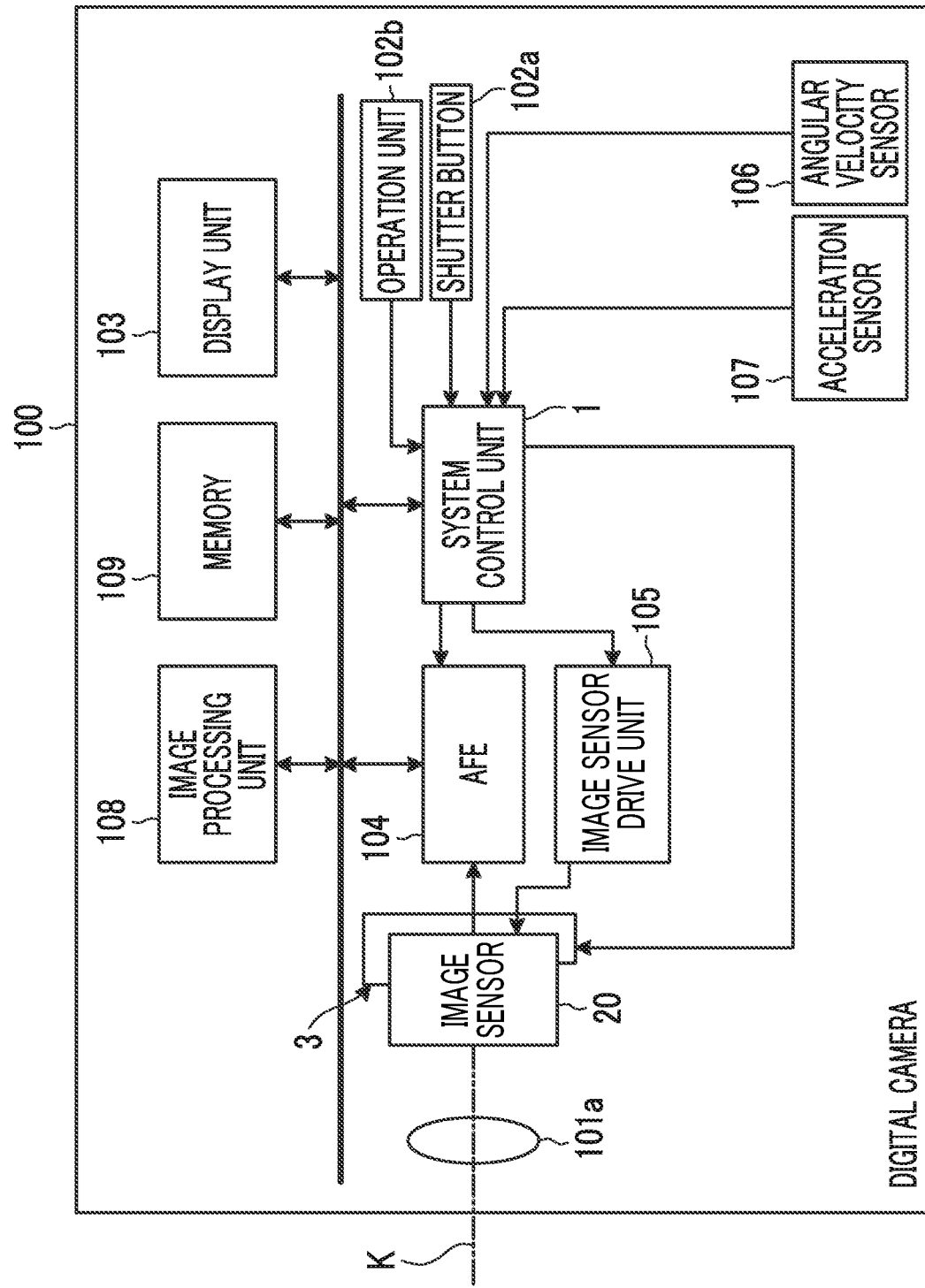
FIG. 3 is a block diagram showing a hardware configuration of the digital camera 100 shown in FIG. 1.

FIG. 1 is a front view showing a schematic configuration of a digital camera 100 which is an embodiment of an imaging apparatus of the present invention. FIG. 2 is a rear view showing the schematic configuration of the digital camera 100 shown in FIG. 1. FIG. 3 is a block diagram showing a hardware configuration of the digital camera 100 shown in FIG. 1.

The digital camera 100 comprises a lens barrel 101 and a finder window 108a (see FIG. 1) provided on a front surface of a housing, a shutter button 102a (see FIGS. 1 and 2) provided on a side surface of the housing, a display unit 103, an eyepiece window 108b, and an operation unit 102b (see FIG. 2) provided on a back surface of the housing, an image sensor 20 provided in the housing, an image blur correction mechanism 3, an analog front end (AFE) 104, an image sensor drive unit 105, an angular velocity sensor 106, an acceleration sensor 107, an image processing unit 108, a memory 109, and a system control unit 1.

The lens barrel 101 has an imaging optical system 101a therein. The imaging optical system 101a includes at least an imaging lens such as a focus lens or a zoom lens. The imaging optical system 101a includes a stop mechanism, a mechanical shutter mechanism, or the like as necessary. The lens barrel 101 may be fixed to a main body of the digital camera 100 or may be attachable to and detachable from the main body of the digital camera 100.

The image sensor 20 images a subject through the imaging optical system 101a, and is a charge coupled device (CCD) image sensor, a complementary metal oxide semiconductor (CMOS) image sensor, or the like. As shown in FIGS. 1 and 2, a light receiving surface of the image sensor 20 has a rectangular shape.

The shutter button 102a is an operation member for instructing that the imaging of the subject using the image sensor 20 is started. In a case where the shutter button 102a is operated, an imaging instruction signal is input to the system control unit 1. In a case where the imaging instruction signal is received, the system control unit 1 controls the image sensor 20 to image the subject.

The operation unit 102b includes a jog dial, a cross key, or a button for performing various operations such as switching between a still image imaging mode for imaging a still image and a motion picture imaging mode for imaging a motion picture, setting an imaging condition, or selecting an imaging menu. In a case where the operation unit 102b is operated, various instruction signals are input to the system control unit 1.

The finder window 108a and the eyepiece window 108b constitute a part of an optical finder. In a case where a user looks through the eyepiece window 108b, the subject can be observed through the finder window 108a. In the digital camera 100, an electronic viewfinder may be used instead of the optical finder. In this case, the finder window 108a is deleted, and an image on a display unit for observing the subject installed in the housing of the digital camera 100 can be viewed by looking through the eyepiece window 108b. The digital camera 100 may have a hybrid finder having both functions of the optical finder and the electronic viewfinder. In any of the finders, the eyepiece window 108b for the user to observe the subject is provided on the back surface of the housing of the digital camera 100.

The display unit 103 is a liquid crystal display (LCD), an organic electro luminescence (EL) display, or the like. In the digital camera 100, in a case where an imaging mode for imaging the subject is set, a live view image is displayed on the display unit 103. Accordingly, the subject can be observed not only by the finder described above but also by the display unit 103.

The image blur correction mechanism 3 images the subject by the image sensor 20 and corrects a blur of a captured image signal output from the image sensor 20 by moving the light receiving surface of the image sensor 20 into a plane perpendicular to an optical axis K of the imaging optical system 101a.

In the digital camera 100, a state in which the light receiving surface of the image sensor 20 is perpendicular to a vertical direction (a state in which the optical axis K is parallel to the vertical direction) and a state in which a center of the light receiving surface is located on the optical axis K are referred to as a reference state.

In the reference state, a longitudinal direction of the light receiving surface of the image sensor 20 is defined as a direction X, a lateral direction of the light receiving surface of the image sensor 20 is defined as a direction Y, and a direction orthogonal to the direction X and the direction Y (a direction in which an optical axis of the imaging optical system 101a extends) is defined as a direction Z (see FIGS. 1 and 2).

The image blur correction mechanism 3 corrects at least a shift blur of image blurs by moving the image sensor 20 in the directions X and Y. The shift blur is a blur of the captured image signal caused by the vibration (translational motion) of the digital camera 100 in the directions X and Y.

The acceleration sensor 107 detects at least an acceleration in each of the directions X and Y which are two directions orthogonal to the optical axis K of the imaging optical system 101a and orthogonal to each other. The direction X is one of the two directions. The direction Y is the other direction of these two directions. Examples of the acceleration sensor 107 include a three-axis acceleration sensor that detects an acceleration in each of the direction X, the direction Y, and the direction Z.

Hereinafter, the acceleration in the direction X detected by the acceleration sensor 107 is referred to as an acceleration Tx, and the acceleration in the direction Y detected by the acceleration sensor 107 is referred to as an acceleration Ty. The accelerations Tx and Ty detected by the acceleration sensor 107 are input to the system control unit 1.

The angular velocity sensor 106 detects at least an angular velocity $\omega_r$ around a rotation axis parallel to the optical axis K of the imaging optical system 101a (parallel to the direction Z). The angular velocity $\omega_r$ detected by the angular velocity sensor 106 is input to the system control unit 1. Examples of the angular velocity sensor 106 include a three-axis angular velocity sensor that detects an angular velocity around a rotation axis extending in the direction X, an angular velocity around a rotation axis extending in the direction Y, and an angular velocity around a rotation axis extending in the direction Z.

The AFE 104 shown in FIG. 3 includes a signal processing circuit that performs Sampling two correlation pile processing, digital conversion processing, and the like on the captured image signal output from the image sensor 20.

The image processing unit 108 shown in FIG. 3 generates captured image data in a Joint Photographic Experts Group (JPEG) format or the like by performing digital signal processing on the captured image signal processed by the AFE 104.

The system control unit 1 shown in FIG. 3 controls the image sensor drive unit 105 and the AFE 104 to cause the image sensor 20 to image the subject and output the captured image signal corresponding to a subject image from the image sensor 20. The system control unit 1 controls the image blur correction mechanism 3 based on motion information of the digital camera 100 detected by the acceleration sensor 107 and the angular velocity sensor 106. The system control unit 1 corrects the shift blur of the captured image signal output from the image sensor 20 by moving the light receiving surface of the image sensor 20 in at least one of the direction X or Y. The system control unit 1, the acceleration sensor 107, and the angular velocity sensor 106 constitute an image blur correction device.

The system control unit 1 controls the entire digital camera 100 as a whole, and is constituted by various processors that perform processing by executing a program including an image blur correction program.

A central processing unit (CPU) which is a general-purpose processor that performs various kinds of processing by executing a program, a programmable logic device (PLD) which is a processor capable of changing a circuit configuration after a field programmable gate array (FPGA) is manufactured, a dedicated electric circuit which is a processor having a circuit configuration specifically designed to execute specific processing such as an application specific integrated circuit (ASIC), or the like is included as various processors.

More specifically, structures of these various processors are electric circuits in which circuit elements such as semiconductor elements are combined.

The system control unit 1 may be constituted by one of various processors, or may be constituted by a combination of two or more processors of the same type or different types (for example, a combination of a plurality of FPGAs or a combination of a CPU and an FPGA).

The memory 109 includes a random access memory (RAM) and a read only memory (ROM). The ROM stores programs (including an image blur correction program) necessary for an operation of the system control unit 1 and various kinds of data.

Figure 4:
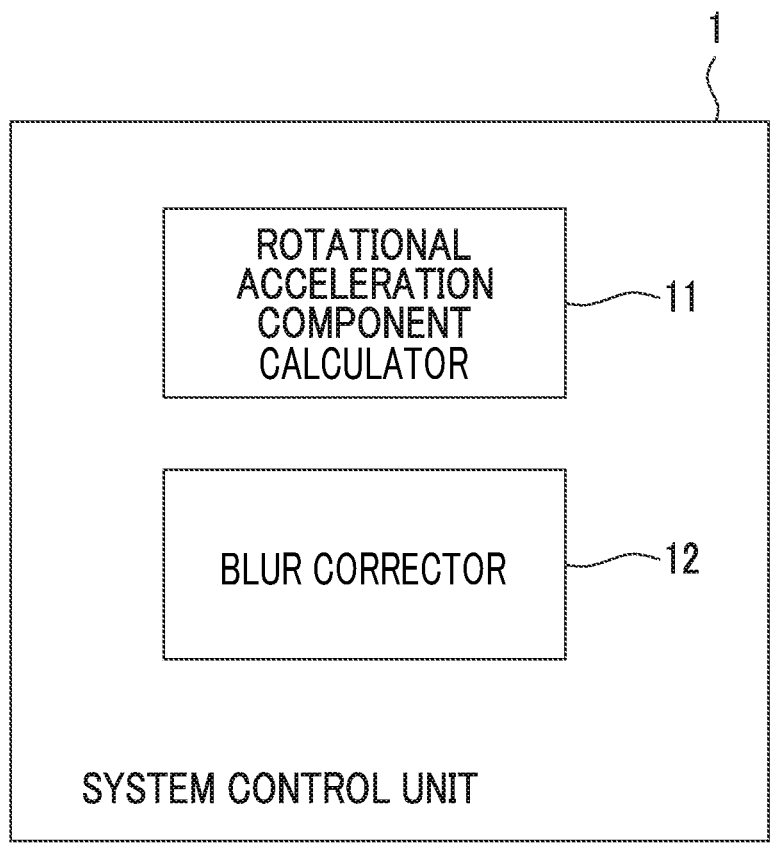
FIG. 4 is a functional block diagram of a system control unit 1 shown in FIG. 3.

FIG. 4 is a functional block diagram of the system control unit 1 shown in FIG. 3. The system control unit 1 functions as a rotational acceleration component calculator 11 and a blur corrector 12 by executing a program including the image blur correction program stored in the ROM of the memory 109.

The rotational acceleration component calculator 11 calculates rotational acceleration components that are included in the accelerations Tx and Ty detected by the acceleration sensor 107 and are generated by the rotation (roll rotation) of the digital camera 100 around the rotation axis parallel to the optical axis K. The rotational acceleration component includes a rotational acceleration component $R_x$ which is an acceleration component generated in the direction X and a rotational acceleration component $R_y$ which is an acceleration component generated in the direction Y.

Specifically, the rotational acceleration component calculator 11 selects one rotation axis from among a plurality of predetermined rotation axes based on a usage state of the digital camera 100, and calculates the rotational acceleration components $R_x$ and $R_y$ generated by the roll rotation of the digital camera 100 around the selected rotation axis based on the angular velocity $\omega_r$ detected by the angular velocity sensor 106 and distances in the directions X and Y from the selected rotation axis to the acceleration sensor 107.

Figure 5:
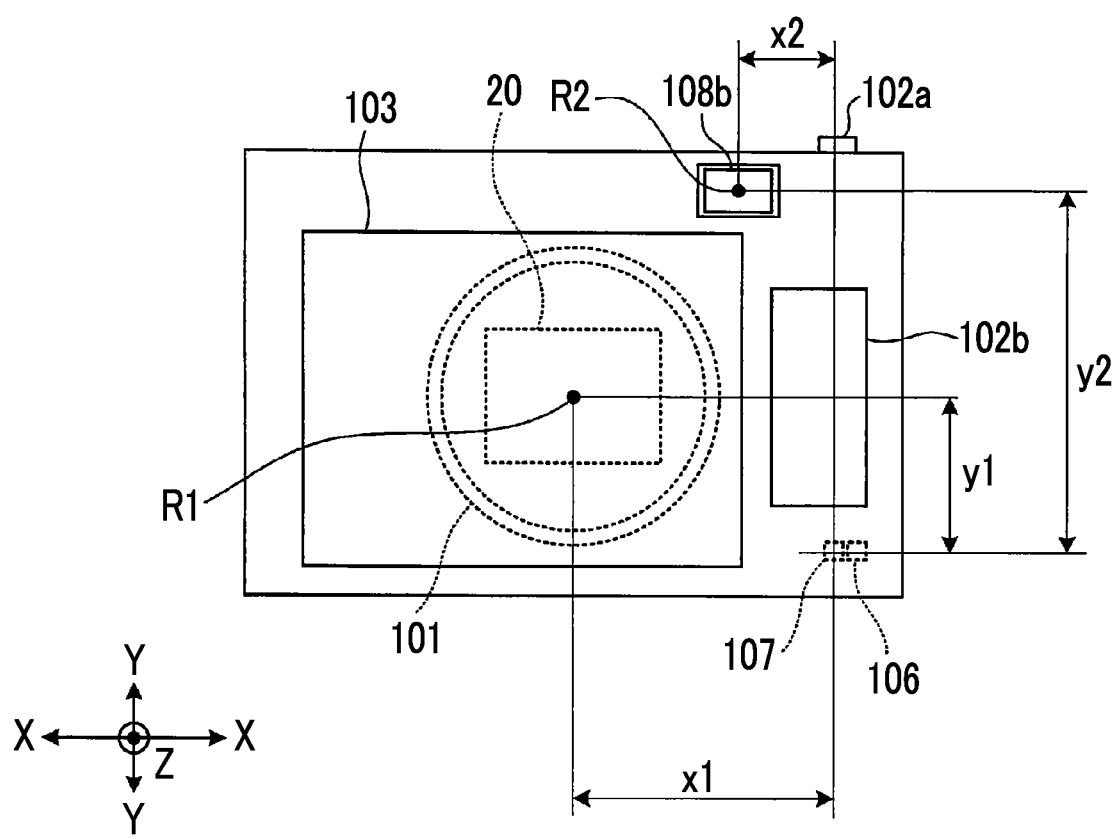
FIG. 5 is a diagram showing a setting example of a rotation axis in the digital camera 100 shown in FIG. 1.

In the digital camera 100, a rotation axis R1 and a rotation axis R2 are set in advance as rotation axes in a case where the digital camera 100 roll-rotates as shown in FIG. 5.

The rotation axis R1 is an axis extending in the direction Z and set at the same position as the optical axis K of the imaging optical system 101a. The rotation axis R2 is an axis extending in the direction Z and set at a position of the eyepiece window 108b. A position of the rotation axis R2 is set at a center of the eyepiece window 108b in the example of FIG. 5, but this position may be any position in a range in which the rotation axis overlaps the eyepiece window 108b.

It is assumed that the user of the digital camera 100 images the subject by pressing the shutter button 102a while viewing the live view image displayed on the display unit 103 and observing the subject. In this case, it is considered that a rotation center in a case where the digital camera 100 roll-rotates is substantially coincident with a position of the optical axis K of the imaging optical system 101a. Thus, the rotation axis R1 is set at the same position as the optical axis K of the imaging optical system 101a.

It is assumed that the user of the digital camera 100 images the subject by pressing the shutter button 102a while observing the subject with one eye on the eyepiece window 108b. In this case, it is considered that the rotation center in a case where the digital camera 100 roll-rotates is substantially coincident with the position of the eyepiece window 108b. Thus, the rotation axis R2 is set at the position of the eyepiece window 108b.

The rotational acceleration component calculator 11 selects any one of the rotation axis R1 and the rotation axis R2 shown in FIG. 5 based on the usage state of the digital camera 100, and calculates the rotational acceleration components $R_x$ and $R_y$ generated by the roll rotation of the digital camera 100 around the selected rotation axis R1 (or rotation axis R2) by the following Equation (A).

In Equation (A), "$p_x$" indicates a distance in the direction X from the selected rotation axis to the acceleration sensor 107. In Equation (A), "$P_y$" indicates a distance in the direction Y from the selected rotation axis to the acceleration sensor 107. In the example of FIG. 5, the distance $p_x$ in a case where the rotation axis R1 is selected is x1, and the distance $p_y$ in a case where the rotation axis R1 is selected is y1. The distance $p_x$ in a case where the rotation axis R2 is selected is x2, and the distance $p_y$ in a case where the rotation axis R2 is selected is y2. "$\omega_{rr}$" indicates an angular acceleration. "$\omega_{r1}$" indicates an angular velocity detected by the angular velocity sensor 106 at a current time, and "$\omega_{r2}$" is an angular velocity detected by the angular velocity sensor 106 t seconds before the current time. "t" is a sampling interval of the angular velocity detected by the angular velocity sensor 106.

$$R_X = \omega_{rr} \cdot \sqrt{p_x^2 + p_y^2} \cdot \cos\theta, R_y = \omega_{rr} \cdot \sqrt{p_x^2 + p_y^2} \cdot \sin\theta \quad (A)$$

$$\theta = \tan^{-1}\left(\frac{p_y}{p_x}\right)$$

$$\omega_{rr} = \frac{\omega_{r1} - \omega_{r2}}{t}$$

The blur corrector 12 corrects the shift blur of the captured image signal in the direction X and the direction Y (translation blur) by obtaining accelerations Sx and Sy obtained by subtracting the rotational acceleration components $R_x$ and $R_y$ calculated by the rotational acceleration component calculator 11 from the accelerations Tx and Ty detected by the acceleration sensor 107 by the calculation of the following Equation (B), obtaining shift blur amounts of the captured image signal output from the image sensor 20 in the direction X and the direction Y (translation blur amounts) based on the accelerations Sx and Sy, and driving the image blur correction mechanism 3 so as to cancel the shift blur amounts.

$$Sx = Tx - R_x$$

$$Sy = Ty - R_y \quad (B)$$

The rotation axis to be selected by the rotational acceleration component calculator 11 is determined in advance according to the usage state of the digital camera 100. The usage state indicates a state in which the digital camera 100 is used in a case where an imaging instruction to instruct that the imaging of the subject is started while the digital camera 100 is set in the imaging mode. In the digital camera 100, this usage state includes a usage state in which the subject is observed by using the eyepiece window 108b and a usage state in which the subject is observed without using the eyepiece window 108b.

Figure 6:
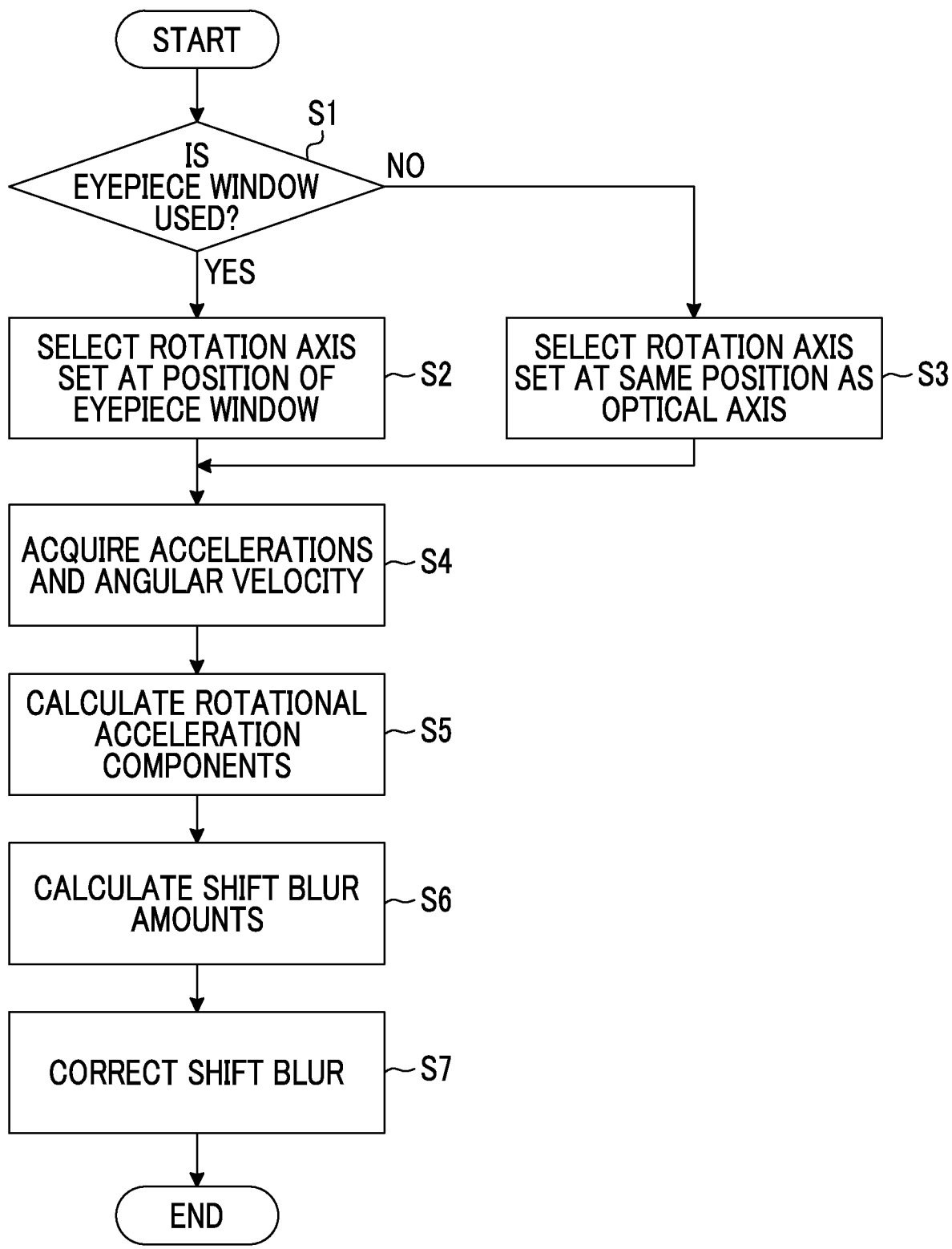
FIG. 6 is a flowchart for describing an operation of the digital camera 100 shown in FIG. 1 in a still image imaging mode.

FIG. 6 is a flowchart for describing an operation of the digital camera 100 shown in FIG. 1 in the still image imaging mode. The shutter button 102a is pressed in a state in which the still image imaging mode is set, the operation shown in FIG. 6 is started.

First, the rotational acceleration component calculator 11 of the system control unit 1 determines whether or not the subject is being observed by using the eyepiece window 108b (step S1). For example, a contact sensor is provided at the eyepiece window 108b. In a case where the contact of an object is detected by the contact sensor, the rotational acceleration component calculator 11 determines that the subject is being observed by using the eyepiece window 108b. Meanwhile, in a case where the contact of the object is not detected by the contact sensor, the rotational acceleration component calculator 11 determines that the subject is observed without using the eyepiece window 108b.

In a case where the eyepiece window 108b of the digital camera 100 constitutes a part of the electronic viewfinder, a switch for turning on and off the function of the electronic viewfinder may be included in the operation unit 102b instead of the contact sensor. The rotational acceleration component calculator 11 may determine that the subject is being observed by using the eyepiece window 108b in a case where the function of the electronic viewfinder is turned on by this switch, and may determine that the subject is being observed without using the eyepiece window 108b in a case where the function of the electronic viewfinder is turned off by this switch.

In a case where it is determined that the subject is being observed by using the eyepiece window 108b (step S1:

YES), the rotational acceleration component calculator 11 selects the rotation axis R2 shown in FIG. 5 set at the position of the eyepiece window 108b (step S2). In a case where it is determined that the subject is being observed without using the eyepiece window 108b (step S1: NO), the rotational acceleration component calculator 11 selects the rotation axis R1 shown in FIG. 5 set at the same position as the optical axis K (step S3).

After step S2 or step S3, the rotational acceleration component calculator 11 acquires the accelerations Tx and Ty from the acceleration sensor 107, and acquires the angular velocity (or from the angular velocity sensor 106 (step S4).

The rotational acceleration component calculator 11 calculates the rotational acceleration components $R_x$ and $R_y$ by substituting the distances $p_x$ and $p_y$ in the directions X and Y between the rotation axis selected in step S2 or step S3 and the acceleration sensor 107, the angular velocity $\omega_r$ acquired in step S4, and the angular velocity $\omega_r$ detected immediately before the angular velocity $\omega_r$ into Equation (A) (step S5). Information on the distances $p_x$ and $p_y$ in the directions X and Y between the rotation axis R1 or R2 and the acceleration sensor 107 is stored in the ROM of the memory 109 in advance.

Next, the blur corrector 12 of the system control unit 1 subtracts the rotational acceleration components $R_x$ and $R_y$ calculated in step S5 from the accelerations Tx and Ty acquired in step S4, calculates the accelerations Sx and Sy obtained by removing the rotational acceleration components caused by the roll rotation, and calculates the shift blur amounts based on the accelerations Sx and Sy (step S6). The blur corrector 12 controls the image blur correction mechanism 3 so as to cancel the shift blur amounts, and corrects the shift blur of the captured image signal output from the image sensor 20 (step S7).

In a case where the digital camera 100 roll-rotates, the rotational acceleration component changes depending on the position of the rotation center. According to the digital camera 100, in a case where the shutter button 102a is pressed in a state in which the eyepiece window 108b is used, it is determined that the digital camera 100 can roll-rotate around the rotation axis R2, and the rotational acceleration components $R_x$ and $R_y$ are calculated. In a case where the shutter button 102a is pressed in a state in which the eyepiece window 108b is unused, it is determined that the digital camera 100 can roll-rotate around the rotation axis R1, and the rotational acceleration components $R_x$ and $R_y$ are calculated. Thus, the rotational acceleration components $R_x$ and $R_y$ can be accurately calculated according to the usage state, and the shift blur of the captured image signal can be corrected with high accuracy.

Figure 7:
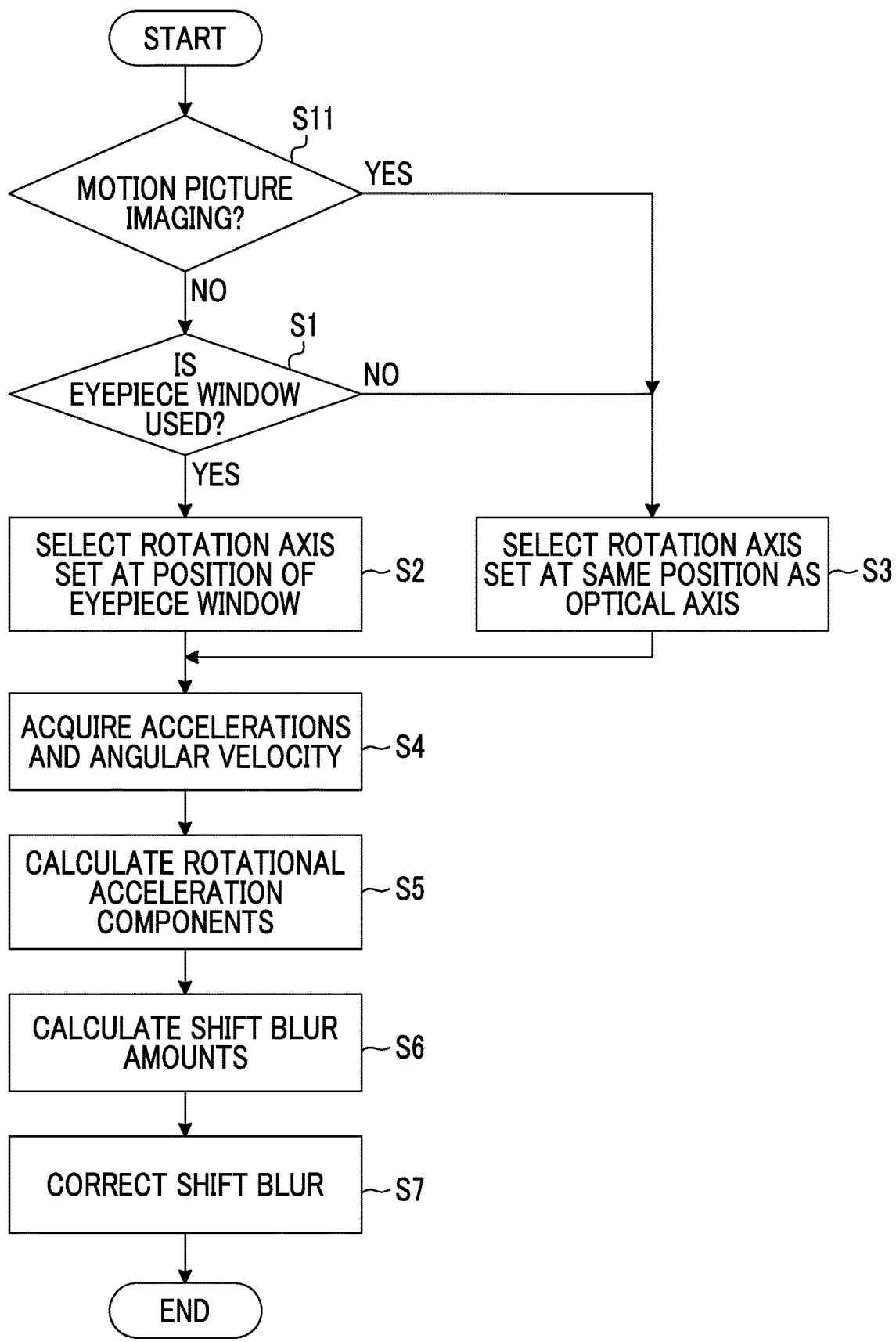
FIG. 7 is a flowchart for describing a modification example of the operation of the digital camera 100 shown in FIG. 1.

FIG. 7 is a flowchart for describing a modification example of the operation of the digital camera 100 shown in FIG. 1. The flowchart shown in FIG. 7 shows an operation after the shutter button 102a is pressed in a state in which the still image imaging mode or the motion picture imaging mode is set. The flowchart shown in FIG. 7 is the same as FIG. 6 except that step S11 is added. The same processing In FIG. 7 as that in FIG. 6 is denoted by the same reference, and the description is omitted.

After the shutter button 102a is pressed, in step S11, the rotational acceleration component calculator 11 of the system control unit 1 determines whether or not the imaging mode is the motion picture imaging mode. The rotational acceleration component calculator 11 moves the processing to step S3 in a case where the imaging mode is the motion picture imaging mode (step S11: YES), and proceeds to step S1 in a case where the imaging mode is the still image imaging mode (step S11: NO).

According to the operation of the modification example, in the motion picture imaging mode, the rotation axis R1 is selected and the rotational acceleration components $R_x$ and $R_y$ are calculated regardless of the usage state of the digital camera 100. The influence on the accelerations Tx and Ty due to the roll rotation that can occur by pressing the shutter button 102a of the digital camera 100 is large in the still image imaging mode in which exposure is performed only once immediately after the shutter button 102a is pressed. In the motion picture imaging mode, since the imaging is continuously performed after the shutter button 102a is pressed, the roll rotation occurs by pressing the shutter button 102a, and the influence on the captured image is slight even though calculation accuracy of the rotational acceleration components generated by the roll rotation. Since the imaging is performed while the digital camera 100 is held by both hands during the imaging of the motion picture in many cases, it is considered that the digital camera 100 easily roll-rotates around the rotation axis R1. Thus, the shift blur can be corrected with high accuracy by selecting the rotation axis R1 during the motion picture imaging.

Figure 8:
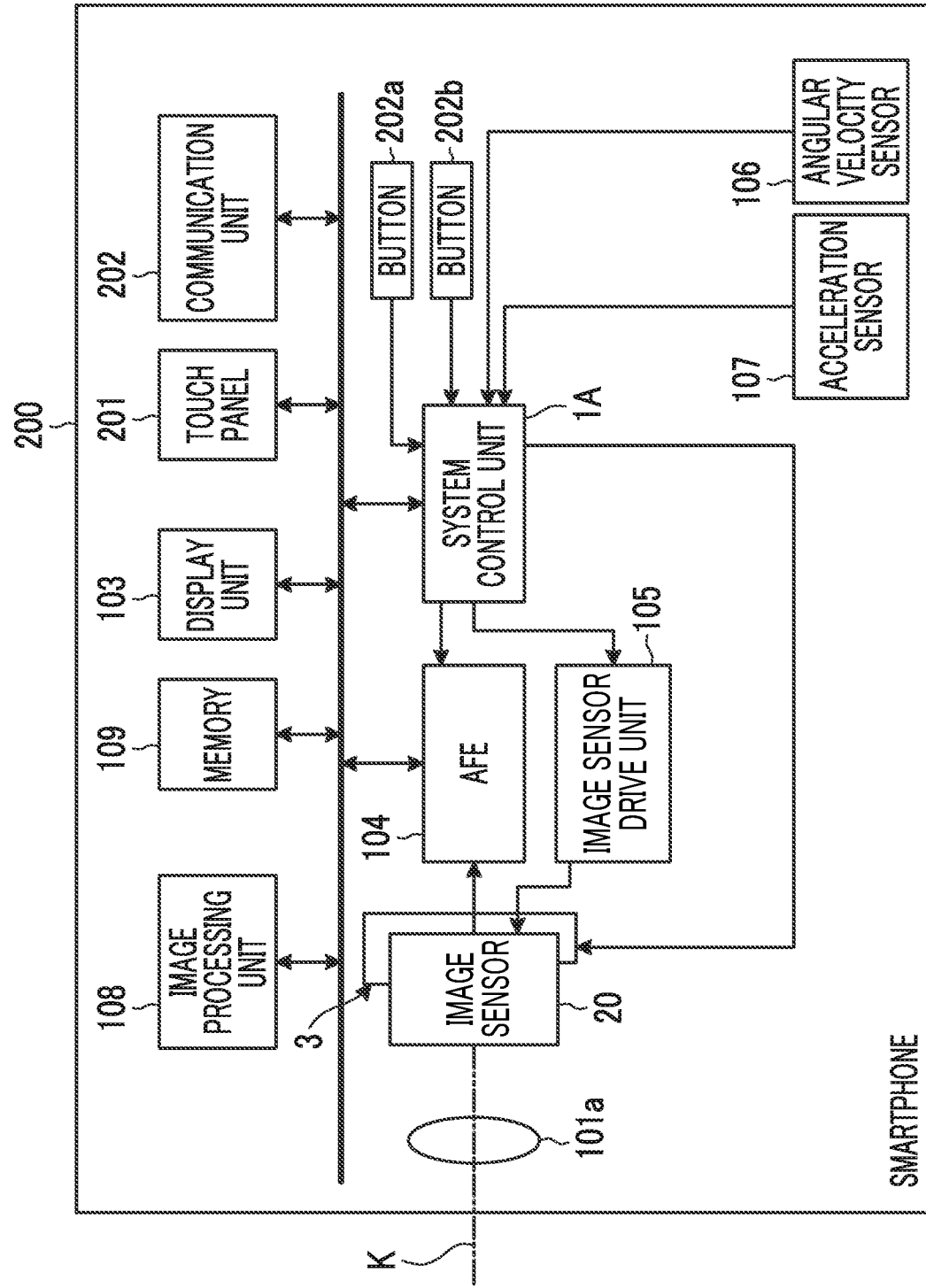
FIG. 8 is a block diagram showing a hardware configuration of a smartphone 200 which is an embodiment of the imaging apparatus of the present invention.
Figure 9:
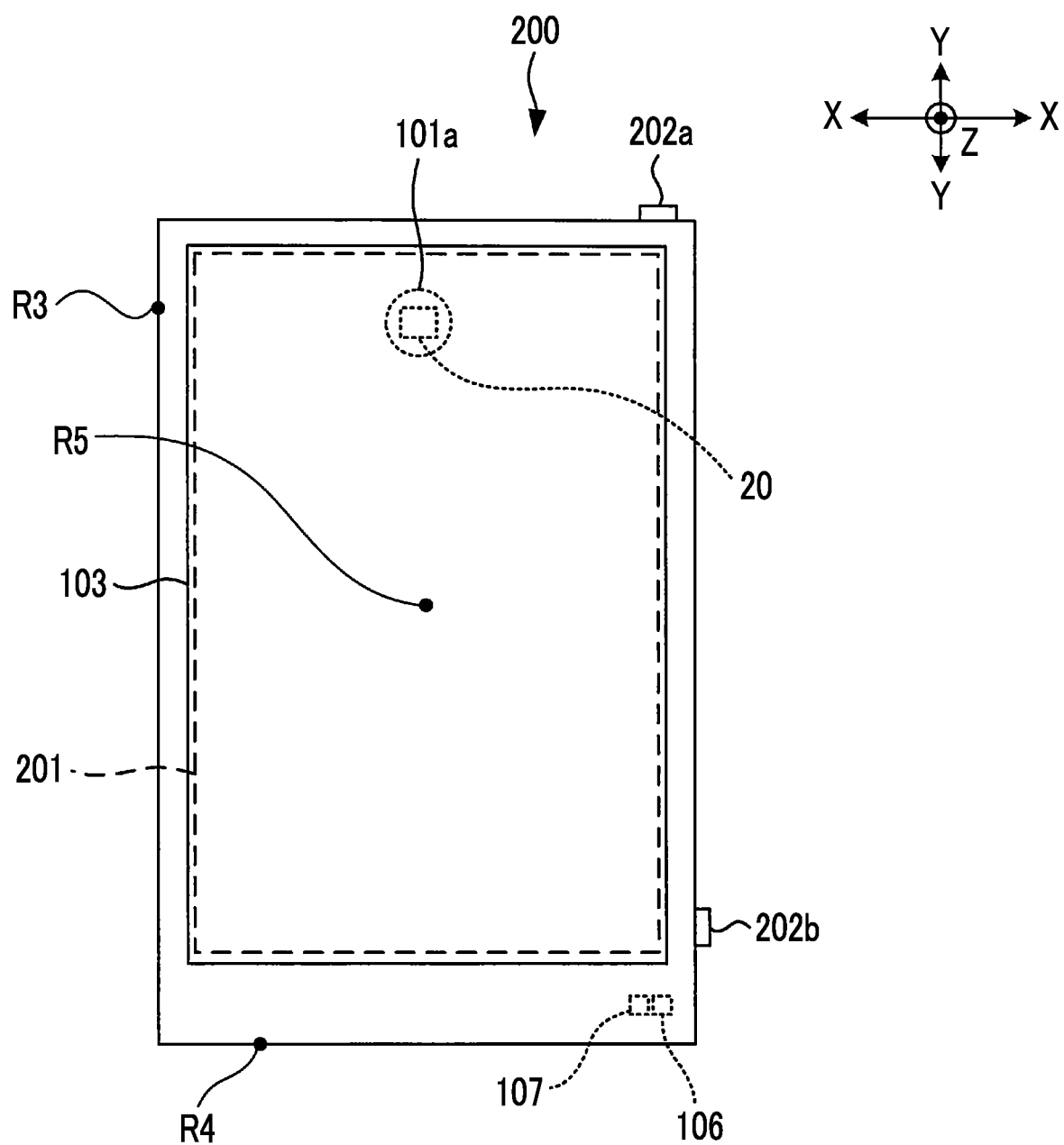
FIG. 9 is a front view showing a schematic configuration of the smartphone 200 shown in FIG. 8.

FIG. 8 is a block diagram showing a hardware configuration of a smartphone 200 which is an embodiment of the imaging apparatus of the present invention. FIG. 9 is a front view showing a schematic configuration of the smartphone 200 shown in FIG. 8. The same components in FIG. 8 as those in FIG. 3 are denoted by the same references.

The smartphone 200 shown in FIG. 8 is the same as the digital camera 100 of FIG. 3 except that the system control unit 1 is changed to a system control unit 1A by adding a touch panel 201, a communication unit 202, a button 202a, and a button 202b and deleting the shutter button 102a and the operation unit 102b. The communication unit 202 is a functional unit for performing near field communication or data communication via a mobile phone network.

As shown in FIG. 9, the display unit 103 is formed on a front surface of a housing of the smartphone 200, and the touch panel 201 is integrally formed on the display unit 103. The imaging optical system 101a is formed on a back surface of the housing of the smartphone 200 (a surface opposite to the front surface on which the display unit 103 is formed).

In the smartphone 200, a state in which the light receiving surface of the image sensor 20 is perpendicular to the vertical direction (a state in which the optical axis K is parallel to the vertical direction) and a state in which the center of the light receiving surface is located on the optical axis K is referred to as a reference state. In this reference state, a longitudinal direction of the light receiving surface of the image sensor 20 is defined as a direction X, a lateral direction of the light receiving surface of the image sensor 20 is defined as a direction Y, and a direction orthogonal to the direction X and the direction Y (a direction in which an optical axis of the imaging optical system 101a extends) is defined as a direction Z.

A planar shape of the display unit 103 viewed from the direction Z is rectangular. The longitudinal direction of the display unit 103 is the direction Y, and the lateral direction of the display unit 103 is the direction X.

As shown in FIG. 9, the button 202a is formed on an upper end of the housing of the smartphone 200 in the direction Y. The button 202b is formed on a right end of the housing of the smartphone 200 in the direction X. The button 202a and the button 202b each function as a shutter button for instructing that the imaging of the subject is started in a state in which a camera application of the smartphone 200 is activated and the smartphone 200 shifts to the imaging mode. The button 202a and the button 202b each constitute an operation member provided at a position different from the display unit 103.

In the smartphone 200, a rotation axis R3, a rotation axis R4, and a rotation axis R5 are set as rotation axes in a case where the smartphone 200 rotates (roll-rotates) around the rotation axis parallel to the optical axis K in advance as shown in FIG. 9.

The rotation axis R5 is an axis extending in the direction Z and set at the center of the display unit 103. The rotation axis R3 is an axis extending in the direction Z and set near the upper end in the direction Y at the left end of the housing of the smartphone 200 in the direction X. The rotation axis R4 is an axis extending in the direction Z and set near the left end in the direction X at a lower end of the housing of the smartphone 200 in the direction Y. The rotation axis R3 and the rotation axis R4 form two rotation axes present at positions different from the optical axis K. The rotation axis R3 is one rotation axis of the two rotation axes, and the rotation axis R4 is the other rotation axis of the two rotation axes.

Unlike the digital camera 100 of FIG. 1, the smartphone 200 does not have the eyepiece window. Thus, in a case where the smartphone 200 shifts to the imaging mode, the live view image captured by the image sensor 20 is displayed on the display unit 103.

In a case where so-called portrait shooting is performed by the smartphone 200, a posture of the smartphone 200 is determined such that the longitudinal direction of the display unit 103 (that is, the direction Y) and the vertical direction are substantially parallel. In a case where so-called landscape shooting is performed by the smartphone 200, the posture of the smartphone 200 is determined such that the lateral direction of the display unit 103 (that is, the direction X) and the vertical direction are substantially parallel.

In the state in which the posture of the smartphone 200 is determined such that the longitudinal direction (direction Y) of the display unit 103 and the vertical direction are substantially parallel to each other, the user determines a composition while holding the vicinity of the button 202a with a right finger and supporting the vicinity of the rotation axis R4 with a left finger. The user images the subject by pressing the button 202a in the direction Y. As described above, in a case where it is assumed that the portrait shooting is performed by using the button 202a, there is a high possibility that the smartphone 200 roll-rotates around the vicinity of the left finger supporting the smartphone 200. The rotation axis R4 is set at a position substantially on a diagonal line of the button 202a on the assumption of such a case.

In the state in which the posture of the smartphone 200 is determined such that the lateral direction (direction X) of the display unit 103 and the vertical direction are substantially parallel to each other, the user determines a composition while holding the vicinity of the button 202b with the right finger and supporting the vicinity of the rotation axis R3 with the left finger. The user images the subject by pressing the button 202b in the direction X. As described above, in a case where it is assumed that the landscape shooting is performed by using the button 202b, there is a high possibility that the smartphone 200 roll-rotates around the vicinity of the left finger supporting the smartphone 200. The rotation axis R3 is set at a position substantially on a diagonal line of the button 202b on the assumption of such a case.

The imaging instruction can be issued to the system control unit 1A by operating the touch panel 201 without using the buttons 202a and 202b in a state in which the smartphone 200 shifts to the imaging mode. As described above, in a case where the imaging is performed by operating the touch panel 201, the housing of the smartphone 200 is firmly gripped by both hands in many cases. Thus, in this case, there is a high possibility that the smartphone 200 roll-rotates around the center of the display unit 103. The rotation axis R5 is set at the center of the display unit 103 on the assumption of such a case.

Figure 10:
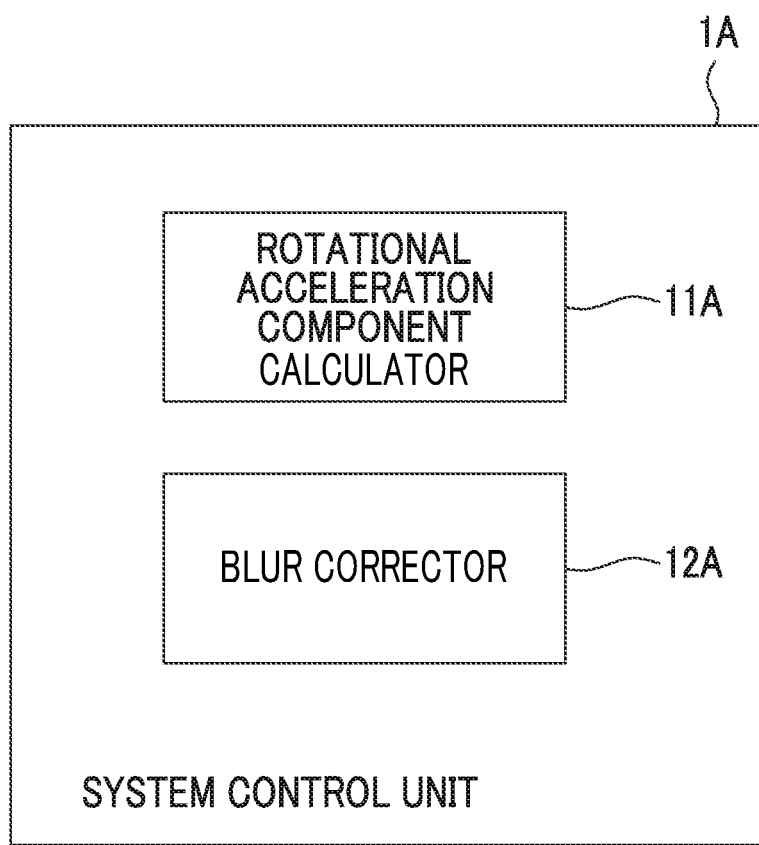
FIG. 10 is a functional block diagram of a system control unit 1A shown in FIG. 8.

FIG. 10 is a functional block diagram of the system control unit 1A shown in FIG. 8. The system control unit 1A functions as a rotational acceleration component calculator 11A and a blur corrector 12A by executing a program including the image blur correction program stored in the ROM of the memory 109. The system control unit 1A, the acceleration sensor 107, and the angular velocity sensor 106 of the smartphone 200 constitute the image blur correction device.

Although a function of the rotational acceleration component calculator 11A is almost the same as that of the rotational acceleration component calculator 11, this rotational acceleration component calculator is different from the rotational acceleration component calculator 11 in that the rotation axis selected in a case where the rotational acceleration components $R_x$ and $R_y$ are calculated is any of the rotation axes R3, R4, and R5 shown in FIG. 9 and the method of selecting the rotation axis is different.

Specifically, the rotational acceleration component calculator 11A selects the rotation axis R5 in the usage state in which the imaging is performed by operating the touch panel 201 (so-called touch imaging), selects the rotation axis R4 in the usage state in which the imaging is performed by operating the button 202a and the direction Y is the vertical direction (state of so-called portrait shooting), and selects the rotation axis R3 in the usage state in which the imaging is performed by operating the button 202b and the direction X is the vertical direction (state of so-called landscape shooting).

The usage state of the smartphone 200 indicates a state in which the smartphone 200 is used in a case where the imaging mode is set. In the smartphone 200, the usage state includes a state in which the touch imaging is performed, a state in which the button is operated in the portrait shooting, and a state in which the button is operated in the landscape shooting.

A function of the blur corrector 12A is the same as that of the blur corrector 12 except that the rotational acceleration components $R_x$ and $R_y$ used for obtaining the accelerations Sx and Sy are calculated by the rotational acceleration component calculator 11A.

Figure 11:
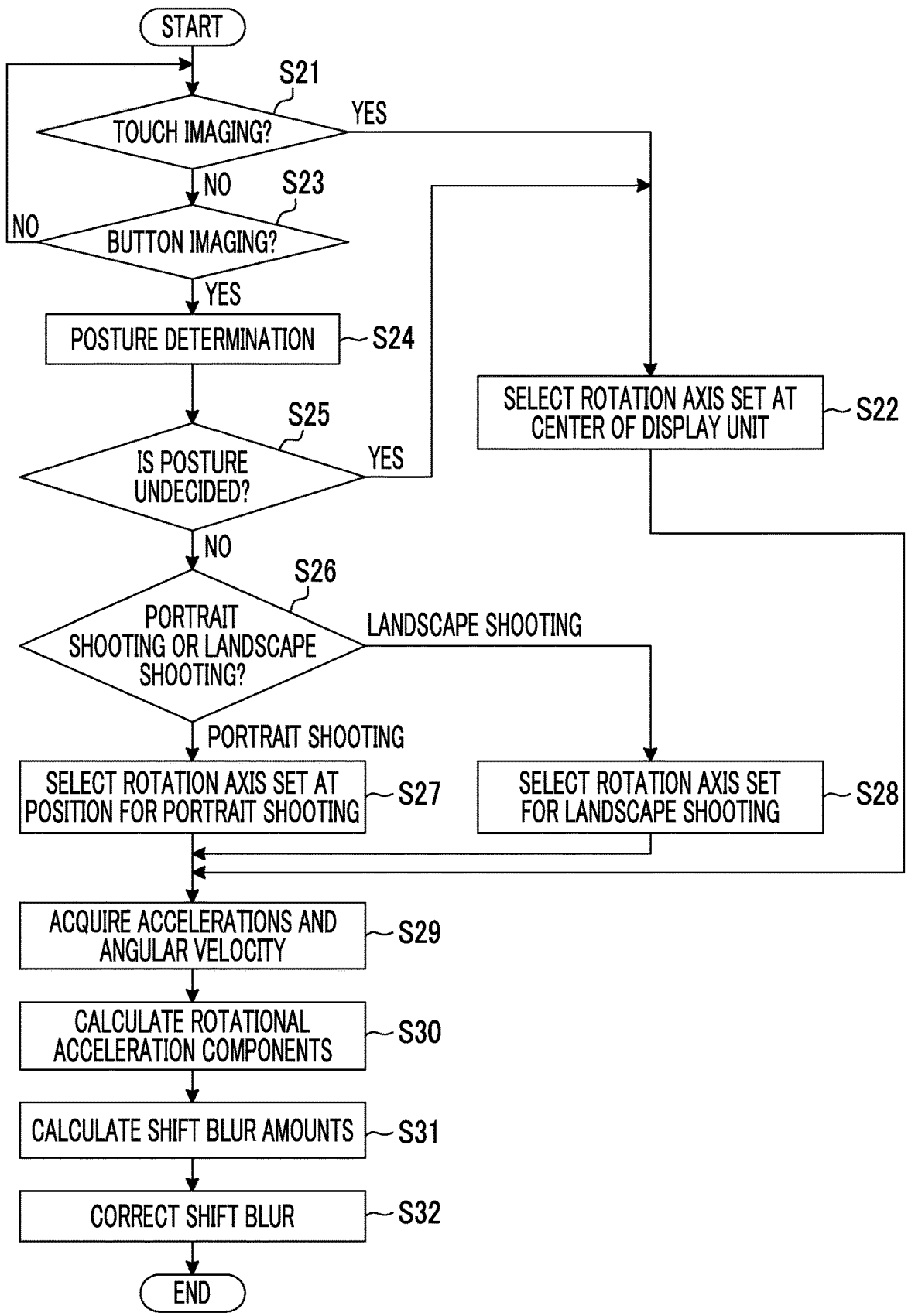
FIG. 11 is a flowchart for describing an operation of the smartphone 200 shown in FIG. 8 in a still image imaging mode.

FIG. 11 is a flowchart for describing an operation of the smartphone 200 shown in FIG. 8 in the still image imaging mode.

In a case where the imaging instruction is given by the operation of the touch panel 201 (step S21: YES), the rotational acceleration component calculator 11A of the system control unit 1A selects the rotation axis R5 set at the center of the display unit 103 (step S22).

In a case where the imaging instruction is not given by the operation of the touch panel 201 (step S21: NO), the rotational acceleration component calculator 11A determines whether or not the imaging instruction is given by the operation of either the button 202a or the button 202b (step S23).

In a case where the imaging instruction is not given by the operation of either the button 202a or the button 202b, the rotational acceleration component calculator 11A returns the processing to step S21 (step S23: NO). In a case where the imaging instruction is given by the operation of either the button 202a or the button 202b (step S23: YES), the rotational acceleration component calculator 11A determines whether or not the posture of the smartphone 200 is either of a landscape shooting posture in which the direction X is the vertical direction or a portrait shooting posture in which the direction Y is the vertical direction based on a detection signal of the acceleration sensor 107 (step S24).

As a result of the determination in step S24, in a case where it is not possible to discriminate between the portrait shooting posture and the landscape shooting posture (step S25: YES), the rotational acceleration component calculator 11A selects the rotation axis R5 in step S22.

As the result of the determination in step S24, in a case where it is determined that the posture is the portrait shooting posture (step S26: portrait shooting), the rotational acceleration component calculator 11A selects the rotation axis R4 set at the position on the assumption of the portrait shooting (step S27).

As the result of the determination in step S24, in a case where it is determined that the posture is the landscape shooting posture (step S26: landscape shooting), the rotational acceleration component calculator 11A selects the rotation axis R3 set at the position on the assumption of the landscape shooting (step S28).

After the rotation axis is selected in any of step S22, step S27, and step S28, the rotational acceleration component calculator 11A acquires the accelerations Tx and Ty from the acceleration sensor 107, and acquires the angular velocity $\omega_r$ from the angular velocity sensor 106 (step S29).

Subsequently, the rotational acceleration component calculator 11A calculates the rotational acceleration components $R_x$ and $R_y$ by substituting the distances $p_x$ and $p_y$ in the directions X and Y between the rotation axis selected in any of step S22, step S27, and step S28 and the acceleration sensor 107, and the angular velocity $\omega_r$ acquired in step S29, and the angular velocity $\omega_r$ detected immediately before the angular velocity $\omega_r$ into Equation (A) (step S30).

Subsequently, the blur corrector 12A of the system control unit 1A subtracts the rotational acceleration components $R_x$ and $R_y$ calculated in step S30 from the accelerations Tx and Ty acquired in step S29, calculates the rotational acceleration components caused by the roll rotation, and calculates the shift blur amounts based on the accelerations Sx and Sy (step S31). The blur corrector 12A controls the image blur correction mechanism 3 so as to cancel the shift blur amounts, and corrects the shift blur of the captured image signal output from the image sensor 20 (step S32).

In a case where the smartphone 200 roll-rotates, the rotational acceleration component changes depending on the position of the rotation center. According to the smartphone 200, in a case where the imaging is performed by operating the touch panel 201, it is determined that the smartphone can roll-rotate around the rotation axis R5, and the rotational acceleration components $R_x$ and $R_y$ are calculated. In a case where the imaging of the portrait shooting is performed by operating the button 202a, it is determined that the smartphone can roll-rotate around the rotation axis R4, and the rotational acceleration components $R_x$ and $R_y$ are calculated. In a case where the imaging of the landscape shooting is performed by operating the button 202b, it is determined that the smartphone can roll-rotate around the rotation axis R3, and the rotational acceleration components $R_x$ and $R_y$ are calculated. Thus, the rotational acceleration components $R_x$ and $R_y$ can be accurately calculated according to the usage state, and the shift blur of the captured image signal can be corrected with high accuracy.

In the smartphone 200, in a case where it is not possible to discriminate whether the posture of the smartphone 200 is the portrait shooting posture or the landscape shooting posture in a case where the imaging is performed, the rotation axis R5 set at the center of the display unit 103 is selected.

For example, in a case where it is erroneously determined that the posture of the smartphone is the landscape shooting posture even though the posture is actually the portrait shooting posture, the rotation axis R3 is selected, and thus, the distances ($p_x$ and $p_y$) between the rotation axis R3 and the acceleration sensor 107 is greater than the correct distances (distances between the rotation axis R4 and the acceleration sensor 107). In such a case, in a case where the rotation axis R5 is selected, the distances between the rotation axis R5 and the acceleration sensor 107 approach the correct distances. Thus, even in a situation in which the posture cannot be discriminated, it is possible to prevent the calculation accuracy of the rotational acceleration components $R_x$ and $R_y$ from being lowered, and it is possible to correct the shift blur of the captured image signal with high accuracy.

In the operation of FIG. 11, step S21 is not essential, and may be a deleted operation. The rotation axes set in the smartphone 200 may be only the rotation axes R3 and R4. In the operation of the smartphone 200 in the still image imaging mode operation in this case, in a case where step S21 and step S22 are deleted in FIG. 11 and the determination in step S25 is YES, for example, the correction may be performed by calculating a translation blur amount without obtaining the rotational acceleration components.

In the digital camera 100 shown in FIG. 2, for example, it is considered that a button for exclusive use of the portrait shooting different from the shutter button 102a is provided on a left side surface of the housing. In the case of such a configuration, the rotation axis on the assumption of the portrait shooting and the rotation axis on the assumption of the landscape shooting may be set at positions different from the rotation axes R1 and R2 of FIG. 5. In the operation of the digital camera 100 having this configuration, step S21 is deleted in FIG. 11, and the processing of step S22 is changed to the processing of selecting the rotation axis R1.

Figure 12:
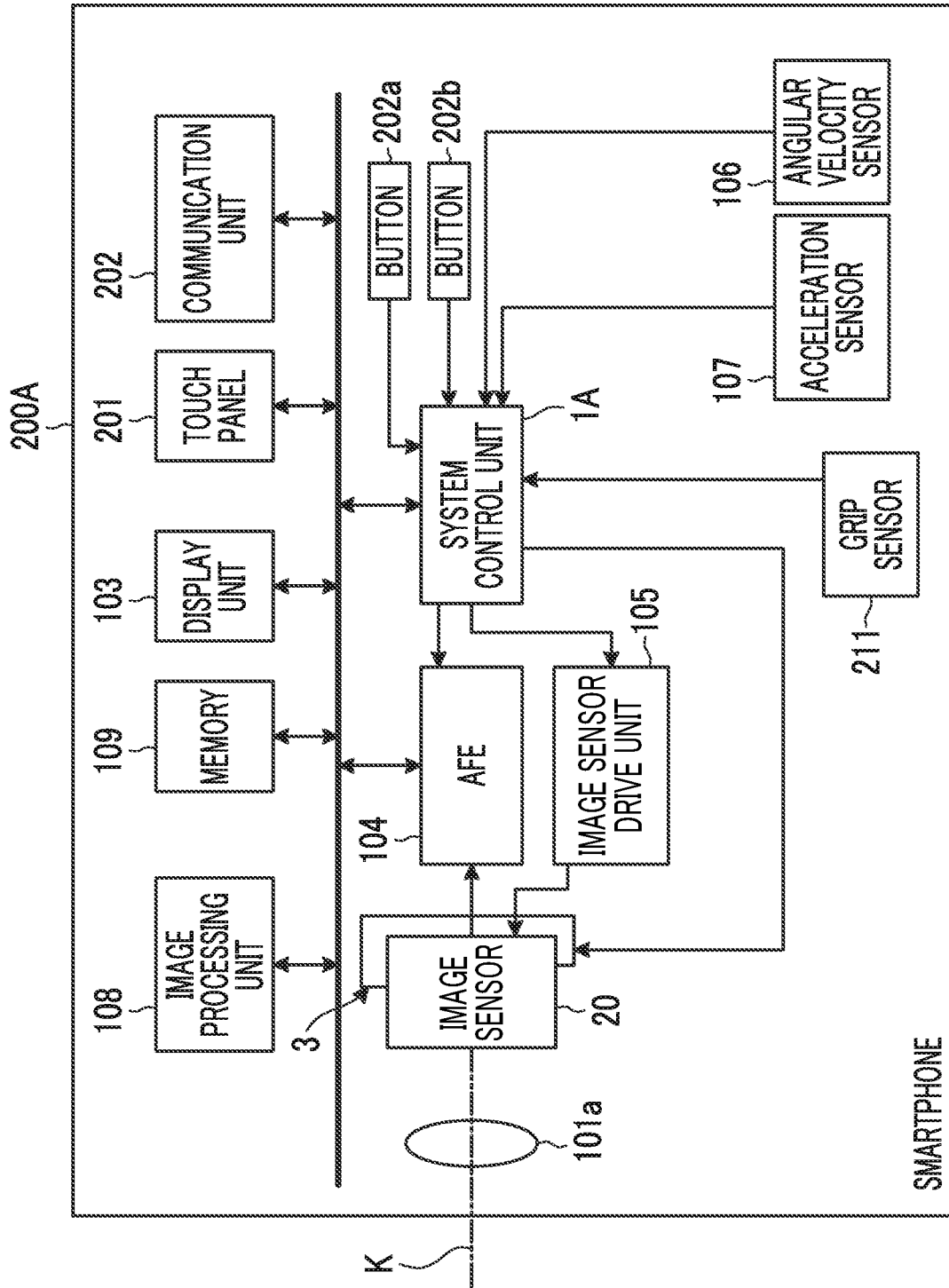
FIG. 12 is a diagram showing a hardware configuration of a smartphone 200A which is a modification example of the smartphone 200 shown in FIG. 8.

FIG. 12 is a diagram showing a hardware configuration of a smartphone 200A which is a modification example of the smartphone 200 shown in FIG. 8. The smartphone 200A shown in FIG. 12 is the same as the smartphone 200 except that a grip sensor 211 is added.

The grip sensor 211 is a sensor for detecting that the housing of the smartphone 200A is gripped by the hand, and is, for example, a piezoelectric sensor or the like. The appearance of the smartphone 200A is the same as that of the smartphone 200.

Figure 13:
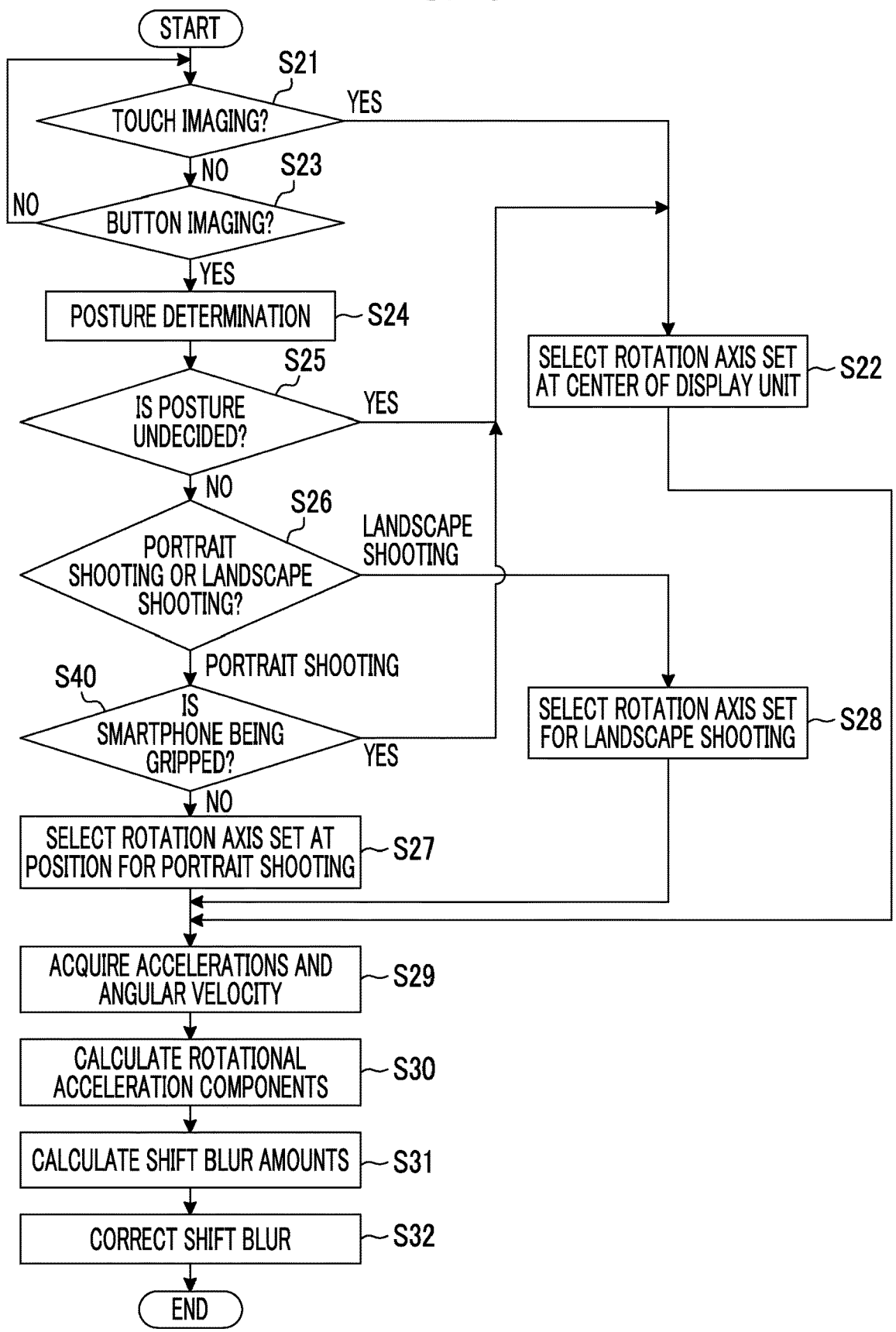
FIG. 13 is a flowchart for describing an operation of the smartphone 200A shown in FIG. 12 in a still image imaging mode.

FIG. 13 is a flowchart for describing an operation of the smartphone 200A shown in FIG. 12 in the still image imaging mode. The flowchart shown in FIG. 13 is the same as the flowchart shown in FIG. 11 except that step S40 is added between steps S26 and S27.

As a result of the posture determination in step S24, in a case where it is determined that the posture is the portrait shooting (step S26: portrait shooting), the rotational acceleration component calculator 11A of the system control unit 1A of the smartphone 200A determines whether or not the smartphone 200A is gripped based on an output signal of the grip sensor 211 (step S40).

In a case where it is determined that the smartphone 200A is gripped (step S40: YES), the rotational acceleration component calculator 11A selects the rotation axis R5 set at the center of the display unit 103 in step S22.

In a case where it is determined that the smartphone 200A is not gripped (step S40: NO), the rotational acceleration component calculator 11A selects the rotation axis R4 in step S27.

Figure 14:
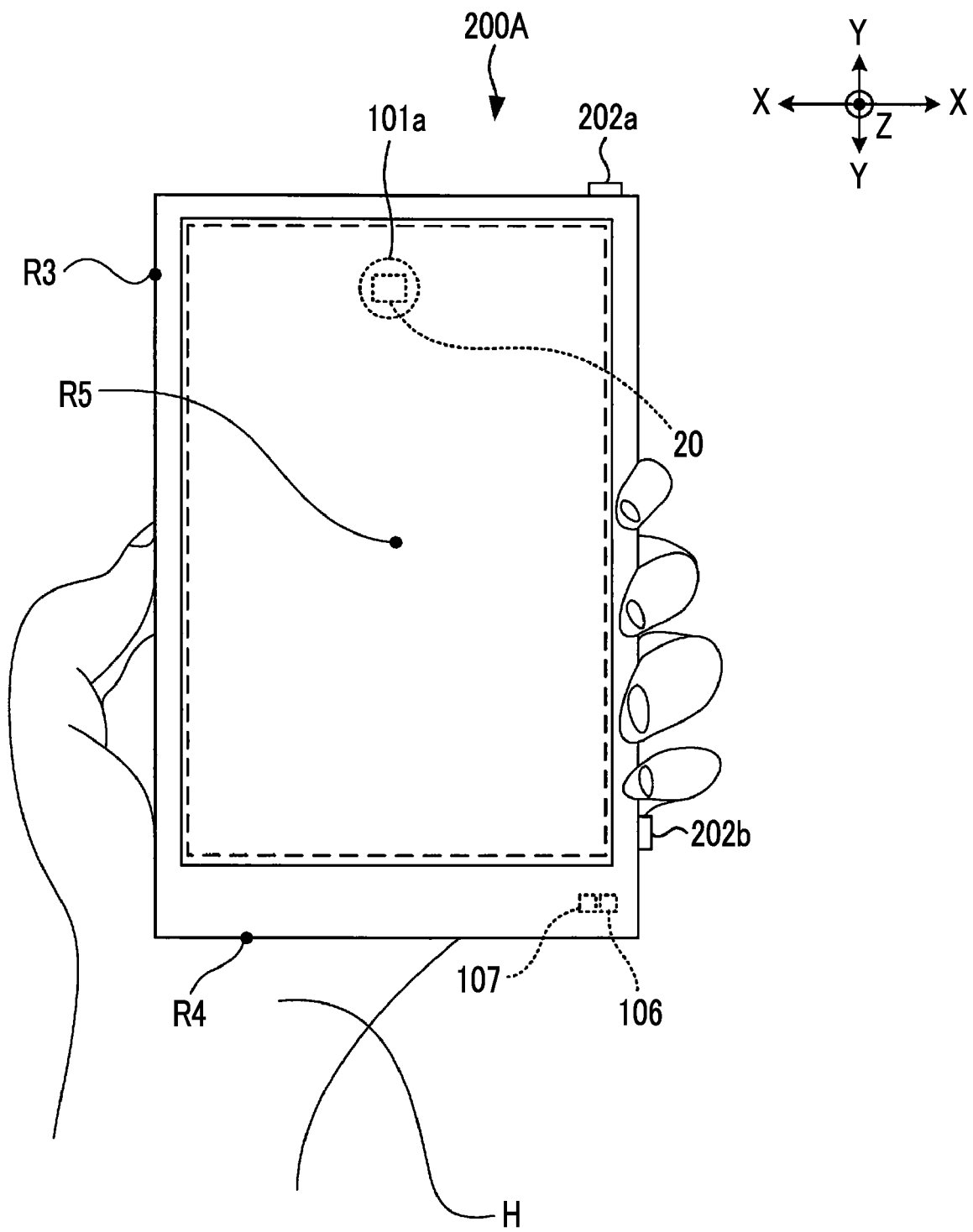
FIG. 14 is a diagram showing a state in which the smartphone 200A shown in FIG. 12 is gripped in portrait shooting.

Even though the posture of the smartphone 200A is the portrait shooting posture in which the direction Y is the vertical direction, the user performs the imaging while fixing the smartphone 200A by gripping the smartphone with a left hand H as shown in FIG. 14 and pressing the button 202a with the right finger in this state in some cases. In such a case (that is, in a case where the determination in step S40 is YES), since there is a possibility that the smartphone 200A roll-rotates around the rotation axis R4 is lowered, it is possible to further improve the accuracy of the image blur correction by selecting the rotation axis R5.

In the motion picture imaging mode of the smartphone 200 or the smartphone 200A, in a case where the imaging instruction is performed regardless of whether the imaging is the touch imaging, button imaging, or any imaging of the portrait shooting and the landscape shooting, it is preferable that the rotational acceleration component calculator 11A selects the rotation axis R5 and calculates the rotational acceleration components $R_x$ and $R_y$. Since the smartphone 200 or 200A performs the imaging while being gripped by both hands during the motion picture imaging, it is considered that the smartphone 200 or 200A is likely to roll-rotate around the rotation axis R5. Thus, the shift blur correction can be performed with high accuracy by selecting the rotation axis R5 during the motion picture imaging.

Although it has been described in the digital camera 100, the smartphone 200, and the smartphone 200A that the shift blur correction is performed by moving the image sensor 20 by the image blur correction mechanism 3, the present invention is not limited thereto. The image blur correction mechanism 3 may correct the shift blur by moving a correction lens included in the imaging optical system 101a, or may correct the shift blur by moving both the image sensor 20 and the correction lens included in the imaging optical system 101a. The blur correction may be electronically performed without optically performing the blur correction as in the image blur correction mechanism 3.

As described above, the following matters are disclosed in this specification.

(1) There is provided an image blur correction device that corrects a blur of a captured image signal output from an image sensor that images a subject through an imaging optical system. The device comprises an acceleration sensor that detects accelerations in two directions which are orthogonal to an optical axis of the imaging optical system of an imaging apparatus including the image sensor and are orthogonal to each other, an angular velocity sensor that detects an angular velocity of the imaging apparatus around a rotation axis parallel to the optical axis, a rotational acceleration component calculator that calculates rotational acceleration components which are included in the accelerations detected by the acceleration sensor and are generated by rotation of the imaging apparatus around the rotation axis, and a blur corrector that corrects blurs of the captured image signal in the two directions based on accelerations obtained by subtracting the rotational acceleration components from the accelerations. The rotational acceleration component calculator selects one rotation axis from among a plurality of the rotation axes determined in advance based on a usage state of the imaging apparatus, and calculates the rotational acceleration components generated by the rotation of the imaging apparatus around the selected rotation axis based on the angular velocity detected by the angular velocity sensor and distances in the two directions from the selected rotation axis and the acceleration sensor.

(2) In the image blur correction device according to (1), the imaging apparatus comprises an eyepiece window for observing the subject, the plurality of rotation axes includes a rotation axis set at a position of the eyepiece window, and a rotation axis set at the same position as the optical axis, and the rotational acceleration component calculator selects the rotation axis set at the position of the eyepiece window in the usage state in which the subject is observed by using the eyepiece window, and selects the rotation axis set at the same position as the optical axis in the usage state in which the subject is observed without using the eyepiece window.

(3) In the image blur correction device according to (1), the plurality of rotation axes includes two rotation axes present at positions different from the optical axis, and the rotational acceleration component calculator selects one of the two rotation axes in the usage state in which one direction of the two directions is a vertical direction, and selects the other rotation axis of the two rotation axes in the usage state in which the other direction of the two directions is the vertical direction.

(4) In the image blur correction device according to (3), the plurality of rotation axes includes a rotation axis present at the same position as the optical axis, and the rotational acceleration component calculator selects the rotation axis present at the same position as the optical axis in the usage state in which the state in which the one direction is the vertical direction and the state in which the other direction is the vertical direction are not able to be discriminated from each other.

(5) In the image blur correction device according to any one of (1) to (4), the plurality of rotation axes includes a rotation axis present at the same position as the optical axis, and the rotational acceleration component calculator selects the rotation axis present at the same position as the optical axis in a case where the imaging apparatus is set in a motion picture imaging mode, and selects the rotation axis based on the usage state in a case where the imaging apparatus is set in a still image imaging mode.

(6) In the image blur correction device according to (3), the imaging apparatus comprises a display unit provided on a surface opposite to the imaging optical system, a touch panel formed on the display unit, and an operation member provided at a position different from the display unit to give an imaging instruction. The plurality of rotation axes further includes a rotation axis which is different from the two rotation axes and is set at a center position of the display unit, and the rotational acceleration component calculator selects the rotation axis set at the center position in the usage state in which imaging is performed by operating the touch panel, selects the one rotation axis of the two rotation axes in the usage state in which imaging is performed by operating the operation member and the one direction is the vertical direction, and selects the other rotation axis of the two rotation axes in the usage state in which imaging is performed by operating the operation member and the other direction is the vertical direction.

(7) In the image blur correction device according to (6), the rotational acceleration component calculator selects the rotation axis set at the center position in the usage state in which the state in which the one direction is the vertical direction and the state in which the other direction is the vertical direction are not able to be discriminated each other.

(8) In the image blur correction device according to (6) or (7), the imaging apparatus comprises a grip sensor detecting that the imaging apparatus is gripped, a longitudinal direction of the display unit is coincident with the other direction, and a lateral direction of the display unit is coincident with the one direction, and the rotational acceleration component calculator selects the rotation axis set at the center position in the usage state in which imaging is performed by operating the operation member, the other direction is the vertical direction, and the grip sensor detects that the imaging apparatus is gripped.

(9) In the image blur correction device according to any one of (6) to (8), the rotational acceleration component calculator selects the rotation axis set at the center position in a case where the imaging apparatus is set in a motion picture imaging mode, and selects the rotation axis based on the usage state in a case where the imaging apparatus is set in a still image imaging mode.

(10) There is provided an imaging apparatus comprising the image blur correction device according to any one of (1) to (9), and the image sensor.

(11) There is provided an image blur correction method of correcting a blur of a captured image signal output from an image sensor that images a subject through an imaging optical system. The method comprises a rotational acceleration component calculation step of calculating rotational acceleration components which are included in accelerations detected by an acceleration sensor that detects the accelerations in two directions which are orthogonal to an optical axis of the imaging optical system of an imaging apparatus including the image sensor and are orthogonal to each other and are generated by rotation of the imaging apparatus around a rotation axis parallel to the optical axis, and a blur correction step of correcting blurs of the captured image signal in the two directions based on accelerations obtained by subtracting the rotational acceleration components from the accelerations. In the rotational acceleration component calculation step, one rotation axis is selected from among a plurality of the rotation axes determined in advance based on a usage state of the imaging apparatus, and the rotational acceleration components generated by the rotation of the imaging apparatus around the selected rotation axis are calculated based on an angular velocity detected by an angular velocity sensor that detects the angular velocity of the imaging apparatus around the rotation axis and distances in the two directions from the selected rotation axis and the acceleration sensor.

(12) In the image blur correction method according to (11), the imaging apparatus comprises an eyepiece window for observing the subject, the plurality of rotation axes includes a rotation axis set at a position of the eyepiece window, and a rotation axis set at the same position as the optical axis, and in the rotational acceleration component calculation step, the rotation axis set at the position of the eyepiece window is selected in the usage state in which the subject is observed by using the eyepiece window, and the rotation axis set at the same position as the optical axis is selected in the usage state in which the subject is observed without using the eyepiece window.

(13) In the image blur correction method according to (11), the plurality of rotation axes includes two rotation axes present at positions different from the optical axis, and in the rotational acceleration component calculation step, one of the two rotation axes is selected in the usage state in which one direction of the two directions is a vertical direction, and the other rotation axis of the two rotation axes is selected in the usage state in which the other direction of the two directions is the vertical direction.

(14) In the image blur correction method according to (13), the plurality of rotation axes includes a rotation axis present at the same position as the optical axis, and in the rotational acceleration component calculation step, the rotation axis present at the same position as the optical axis is selected in the usage state in which the state in which the one direction is the vertical direction and the state in which the other direction is the vertical direction are not able to be discriminated from each other.

(15) In the image blur correction method according to any one of (11) to (14), the plurality of rotation axes includes a rotation axis present at the same position as the optical axis, and in the rotational acceleration component calculation step, the rotation axis present at the same position as the optical axis is selected in a case where the imaging apparatus is set in a motion picture imaging mode, and the rotation axis is selected based on the usage state in a case where the imaging apparatus is set in a still image imaging mode.

(16) In the image blur correction method according to (13), the imaging apparatus comprises a display unit provided on a surface opposite to the imaging optical system, a touch panel formed on the display unit, and an operation member provided at a position different from the display unit to give an imaging instruction, the plurality of rotation axes further includes a rotation axis which is different from the two rotation axes and is set at a center position of the display unit, and in the rotational acceleration component calculation step, the rotation axis set at the center position is selected in the usage state in which imaging is performed by operating the touch panel, the one rotation axis of the two rotation axes is selected in the usage state in which imaging is performed by operating the operation member and the one direction is the vertical direction, and the other rotation axis of the two rotation axes is selected in the usage state in which imaging is performed by operating the operation member and the other direction is the vertical direction.

(17) In the image blur correction method according to (16), in the rotational acceleration component calculation step, the rotation axis set at the center position is selected in the usage state in which the state in which the one direction is the vertical direction and the state in which the other direction is the vertical direction are not able to be discriminated from each other.

(18) In the image blur correction method according to (16) or (17), the imaging apparatus comprises a grip sensor detecting that the imaging apparatus is gripped, a longitudinal direction of the display unit is coincident with the other direction, and a lateral direction of the display unit is coincident with the one direction, and in the rotational acceleration component calculation step, the rotation axis set at the center position is selected in the usage state in which imaging is performed by operating the operation member, the other direction is the vertical direction, and the grip sensor detects that the imaging apparatus is gripped.

(19) In the image blur correction method according to any one of (16) to (18), in the rotational acceleration component calculation step, the rotation axis set at the center position is selected in a case where the imaging apparatus is set in a motion picture imaging mode, and the rotation axis is selected based on the usage state in a case where the imaging apparatus is set in a still image imaging mode.

(20) There is provided an image blur correction program for correcting a blur of a captured image signal output from an image sensor that images a subject through an imaging optical system. The program causes a computer to execute a rotational acceleration component calculation step of calculating rotational acceleration components which are included in accelerations detected by an acceleration sensor that detects the accelerations in two directions which are orthogonal to an optical axis of the imaging optical system of an imaging apparatus including the image sensor and are orthogonal to each other and are generated by rotation of the imaging apparatus around a rotation axis parallel to the optical axis, and a blur correction step of correcting blurs of the captured image signal in the two directions based on accelerations obtained by subtracting the rotational acceleration components from the accelerations. In the rotational acceleration component calculation step, one rotation axis is selected from among a plurality of the rotation axes determined in advance based on a usage state of the imaging apparatus, and the rotational acceleration components generated by the rotation of the imaging apparatus around the selected rotation axis are calculated based on an angular velocity detected by an angular velocity sensor that detects the angular velocity of the imaging apparatus around the selected rotation axis and distances in the two directions from the selected rotation axis and the acceleration sensor.

Although various embodiments have been described with reference to the drawings, the present invention is not limited to such examples. It is obvious to those skilled in the art that various changes or modifications can be conceived within the scope described in the claims, and naturally, these changes or modifications also belong to the technical scope of the present invention. The components in the above-described embodiment may be optionally combined without departing from the spirit of the invention.

The present application is based on the Japanese patent application filed on Jun. 27, 2018 (JP2018-122366), the contents of which are incorporated by reference into the present application.

The present invention is highly convenient and effective by being applied to a digital camera, a smartphone, or the like.

EXPLANATION OF REFERENCES

3: image blur correction mechanism
20: image sensor
100: digital camera
101: lens barrel
101a: imaging optical system
102a: shutter button
102b: operation unit
103: display unit
104: AFE
105: image sensor drive unit
106: angular velocity sensor
107: acceleration sensor
108: image processing unit
109: memory
108a: finder window
108b: eyepiece window
1, 1A: system control unit
11, 11A: rotational acceleration component calculator
12, 12A: blur corrector
K: optical axis
R1, R2, R3, R4, R5: rotation axis
200, 200A: smartphone
201: touch panel
202: communication unit
202a, 202b: button
211: grip sensor
H: left hand

What is claimed is:

1. An image blur correction device configured to correct a blur of a captured image signal output from an image sensor that images a subject through an imaging optical system, the device comprising:
an acceleration sensor that detects accelerations in two directions which are orthogonal to an optical axis of the imaging optical system of an imaging apparatus including the image sensor and are orthogonal to each other;
an angular velocity sensor that detects an angular velocity of the imaging apparatus around a rotation axis parallel to the optical axis;
a rotational acceleration component calculator that calculates rotational acceleration components which are included in the accelerations detected by the acceleration sensor and are generated by rotation of the imaging apparatus around the rotation axis; and
a blur corrector that corrects blurs of the captured image signal in the two directions based on accelerations obtained by subtracting the rotational acceleration components from the accelerations detected by the acceleration sensor,
wherein the rotational acceleration component calculator selects one rotation axis from among a plurality of the rotation axes determined in advance based on a usage state of the imaging apparatus, and calculates the rotational acceleration components generated by the rotation of the imaging apparatus around the selected rotation axis based on the angular velocity detected by the angular velocity sensor and distances in the two directions from the selected rotation axis to the acceleration sensor.

2. The image blur correction device according to claim 1, wherein the imaging apparatus comprises an eyepiece window for observing the subject,
the plurality of rotation axes includes a rotation axis set at a position of the eyepiece window, and a rotation axis set at the same position as the optical axis, and
the rotational acceleration component calculator selects the rotation axis set at the position of the eyepiece window in the usage state in which the subject is observed by using the eyepiece window, and selects the rotation axis set at the same position as the optical axis in the usage state in which the subject is observed without using the eyepiece window.

3. The image blur correction device according to claim 1, wherein the plurality of rotation axes includes two rotation axes present at positions different from the optical axis, and
the rotational acceleration component calculator selects one of the two rotation axes in the usage state in which one direction of the two directions is a vertical direction, and selects the other rotation axis of the two rotation axes in the usage state in which the other direction of the two directions is the vertical direction.

4. The image blur correction device according to claim 3, wherein the plurality of rotation axes includes a rotation axis present at the same position as the optical axis, and
the rotational acceleration component calculator selects the rotation axis present at the same position as the optical axis in a case in which the usage state in which the one direction is the vertical direction and the usage state in which the other direction is the vertical direction are not able to be discriminated from each other.

5. The image blur correction device according to claim 1,
wherein the plurality of rotation axes includes a rotation axis present at the same position as the optical axis, and
the rotational acceleration component calculator selects the rotation axis present at the same position as the optical axis in a case where the imaging apparatus is set in a motion picture imaging mode, and selects the rotation axis based on the usage state in a case where the imaging apparatus is set in a still image imaging mode.

6. The image blur correction device according to claim 3,
wherein the imaging apparatus comprises a display unit provided on a surface opposite to the imaging optical system, a touch panel formed on the display unit, and an operation member provided at a position different from the display unit to give an imaging instruction,
the plurality of rotation axes further includes a rotation axis which is different from the two rotation axes and is set at a center position of the display unit, and
the rotational acceleration component calculator selects the rotation axis set at the center position in the usage state in which imaging is performed by operating the touch panel, selects the one rotation axis of the two rotation axes in the usage state in which imaging is performed by operating the operation member and in which the one direction is the vertical direction, and selects the other rotation axis of the two rotation axes in the usage state in which imaging is performed by operating the operation member and in which the other direction is the vertical direction.

7. The image blur correction device according to claim 6,
wherein the rotational acceleration component calculator selects the rotation axis set at the center position in a case in which the usage state in which the one direction is the vertical direction and the usage state in which the other direction is the vertical direction are not able to be discriminated from each other.

8. The image blur correction device according to claim 6,
wherein the imaging apparatus comprises a grip sensor detecting that the imaging apparatus is gripped,
a longitudinal direction of the display unit is coincident with the other direction, and a lateral direction of the display unit is coincident with the one direction, and
the rotational acceleration component calculator selects the rotation axis set at the center position in the usage state in which imaging is performed by operating the operation member, the other direction is the vertical direction, and the grip sensor detects that the imaging apparatus is gripped.

9. The image blur correction device according to claim 6,
wherein the rotational acceleration component calculator selects the rotation axis set at the center position in a case where the imaging apparatus is set in a motion picture imaging mode, and selects the rotation axis based on the usage state in a case where the imaging apparatus is set in a still image imaging mode.

10. An imaging apparatus comprising:
the image blur correction device according to claim 1; and
the image sensor.

11. An image blur correction method of correcting a blur of a captured image signal output from an image sensor that images a subject through an imaging optical system, the method comprising:
a rotational acceleration component calculation step of calculating rotational acceleration components which are included in accelerations detected by an acceleration sensor that detects the accelerations in two directions which are orthogonal to an optical axis of the imaging optical system of an imaging apparatus including the image sensor and are orthogonal to each other and are generated by rotation of the imaging apparatus around a rotation axis parallel to the optical axis; and
a blur correction step of correcting blurs of the captured image signal in the two directions based on accelerations obtained by subtracting the rotational acceleration components from the accelerations detected by the acceleration sensor,
wherein, in the rotational acceleration component calculation step, one rotation axis is selected from among a plurality of the rotation axes determined in advance based on a usage state of the imaging apparatus, and the rotational acceleration components generated by the rotation of the imaging apparatus around the selected rotation axis are calculated based on an angular velocity detected by an angular velocity sensor that detects the angular velocity of the imaging apparatus around the rotation axis and distances in the two directions from the selected rotation axis to the acceleration sensor.

12. The image blur correction method according to claim 11,
wherein the imaging apparatus comprises an eyepiece window for observing the subject,
the plurality of rotation axes includes a rotation axis set at a position of the eyepiece window, and a rotation axis set at the same position as the optical axis, and
in the rotational acceleration component calculation step, the rotation axis set at the position of the eyepiece window is selected in the usage state in which the subject is observed by using the eyepiece window, and the rotation axis set at the same position as the optical axis is selected in the usage state in which the subject is observed without using the eyepiece window.

13. The image blur correction method according to claim 11,
wherein the plurality of rotation axes includes two rotation axes present at positions different from the optical axis, and
in the rotational acceleration component calculation step, one of the two rotation axes is selected in the usage state in which one direction of the two directions is a vertical direction, and the other rotation axis of the two rotation axes is selected in the usage state in which the other direction of the two directions is the vertical direction.

14. The image blur correction method according to claim 13,
wherein the plurality of rotation axes includes a rotation axis present at the same position as the optical axis, and
in the rotational acceleration component calculation step, the rotation axis present at the same position as the optical axis is selected in a case in which the usage state in which the one direction is the vertical direction and the usage state in which the other direction is the vertical direction are not able to be discriminated from each other.

15. The image blur correction method according to claim 11,
wherein the plurality of rotation axes includes a rotation axis present at the same position as the optical axis, and
in the rotational acceleration component calculation step, the rotation axis present at the same position as the optical axis is selected in a case where the imaging apparatus is set in a motion picture imaging mode, and the rotation axis is selected based on the usage state in a case where the imaging apparatus is set in a still image imaging mode.

16. The image blur correction method according to claim 13,
wherein the imaging apparatus comprises a display unit provided on a surface opposite to the imaging optical system, a touch panel formed on the display unit, and an operation member provided at a position different from the display unit to give an imaging instruction,
the plurality of rotation axes further includes a rotation axis which is different from the two rotation axes and is set at a center position of the display unit, and
in the rotational acceleration component calculation step, the rotation axis set at the center position is selected in the usage state in which imaging is performed by operating the touch panel, the one rotation axis of the two rotation axes is selected in the usage state in which imaging is performed by operating the operation member and in which the one direction is the vertical direction, and the other rotation axis of the two rotation axes is selected in the usage state in which imaging is performed by operating the operation member and in which the other direction is the vertical direction.

17. The image blur correction method according to claim 16,
wherein, in the rotational acceleration component calculation step, the rotation axis set at the center position is selected in a case in which the usage state in which the one direction is the vertical direction and the usage state in which the other direction is the vertical direction are not able to be discriminated from each other.

18. The image blur correction method according to claim 16,
wherein the imaging apparatus comprises a grip sensor detecting that the imaging apparatus is gripped,
a longitudinal direction of the display unit is coincident with the other direction, and a lateral direction of the display unit is coincident with the one direction, and
in the rotational acceleration component calculation step, the rotation axis set at the center position is selected in the usage state in which imaging is performed by operating the operation member, the other direction is the vertical direction, and the grip sensor detects that the imaging apparatus is gripped.

19. The image blur correction method according to claim 16,
wherein, in the rotational acceleration component calculation step, the rotation axis set at the center position is selected in a case where the imaging apparatus is set in a motion picture imaging mode, and the rotation axis is selected based on the usage state in a case where the imaging apparatus is set in a still image imaging mode.

20. A non-transitory computer readable medium storing an image blur correction program for correcting a blur of a captured image signal output from an image sensor that images a subject through an imaging optical system, the program causing a computer to execute:
a rotational acceleration component calculation step of calculating rotational acceleration components which are included in accelerations detected by an acceleration sensor that detects the accelerations in two directions which are orthogonal to an optical axis of the imaging optical system of an imaging apparatus including the image sensor and are orthogonal to each other and are generated by rotation of the imaging apparatus around a rotation axis parallel to the optical axis; and
a blur correction step of correcting blurs of the captured image signal in the two directions based on accelerations obtained by subtracting the rotational acceleration components from the accelerations detected by the acceleration sensor,
wherein, in the rotational acceleration component calculation step, one rotation axis is selected from among a plurality of the rotation axes determined in advance based on a usage state of the imaging apparatus, and the rotational acceleration components generated by the rotation of the imaging apparatus around the selected rotation axis are calculated based on an angular velocity detected by an angular velocity sensor that detects the angular velocity of the imaging apparatus around the selected rotation axis and distances in the two directions from the selected rotation axis to the acceleration sensor.

* * * * *